United States Patent
Cervelli et al.

(10) Patent No.: US 10,360,702 B2
(45) Date of Patent: *Jul. 23, 2019

(54) TIME-SERIES ANALYSIS SYSTEM

(71) Applicant: Palantir Technologies Inc., Palo Alto, CA (US)

(72) Inventors: Daniel Cervelli, Mountain View, CA (US); David Skiff, Redwood City, CA (US); David Tobin, Atherton, CA (US); Allen Cai, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,868

(22) Filed: Nov. 17, 2016

(65) Prior Publication Data
US 2017/0139558 A1   May 18, 2017

Related U.S. Application Data

(63) Continuation of application No. 14/871,465, filed on Sep. 30, 2015, now Pat. No. 9,501,851.
(Continued)

(51) Int. Cl.
*G06T 11/20* (2006.01)
*G06F 16/2458* (2019.01)
(Continued)

(52) U.S. Cl.
CPC .......... *G06T 11/206* (2013.01); *G06F 3/0482* (2013.01); *G06F 3/04842* (2013.01);
(Continued)

(58) Field of Classification Search
CPC . G06F 3/04842; G06F 3/04847; G06T 11/206
See application file for complete search history.

(56) References Cited

U.S. PATENT DOCUMENTS 4,881,179 A   11/1989   Vincent
5,109,399 A    4/1992   Thompson
(Continued)

FOREIGN PATENT DOCUMENTS

AU   2013251186   11/2015
CN    102054015    5/2014
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Michelle L Sams
(74) *Attorney, Agent, or Firm* — Knobbe Martens Olson & Bear LLP

(57) ABSTRACT

Various systems and methods are provided that display various graphs in an interactive user interface in substantially real-time in response to input from a user in order to determine information related to measured data points and provide the determined information to the user in the interactive user interface. For example, a computing device may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges.

20 Claims, 36 Drawing Sheets

Related U.S. Application Data

(60) Provisional application No. 62/206,159, filed on Aug. 17, 2015, provisional application No. 62/059,601, filed on Oct. 3, 2014.

(51) Int. Cl.
  *G06F 3/0484* (2013.01)
  *G06F 3/0482* (2013.01)

(52) U.S. Cl.
  CPC ...... *G06F 3/04845* (2013.01); *G06F 3/04847* (2013.01); *G06F 16/2477* (2019.01); *G06F 2203/04806* (2013.01)

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,999,911 A | 12/1999 | Berg et al. |
| 6,057,757 A | 5/2000 | Arrowsmith et al. |
| 6,065,026 A | 5/2000 | Cornelia et al. |
| 6,091,956 A | 7/2000 | Hollenberg |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,374,251 B1 | 4/2002 | Fayyad et al. |
| 6,430,305 B1 | 8/2002 | Decker |
| 6,456,997 B1 | 9/2002 | Shukla |
| 6,523,019 B1 | 2/2003 | Borthwick |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,086,028 B1 | 8/2006 | Davis et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B1 | 1/2007 | Witowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,765,489 B1 | 7/2010 | Shah |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,042,110 B1 | 10/2011 | Kawahara et al. |
| 8,073,857 B2 | 12/2011 | Sreekanth |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |

(56) References Cited

U.S. PATENT DOCUMENTS

| | | |
|---|---|---|
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,386,377 B1 | 2/2013 | Xiong et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,069,842 B2 | 6/2015 | Melby |
| 9,116,975 B2 | 8/2015 | Shankar et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 2001/0021936 A1 | 9/2001 | Bertram |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0078451 A1 | 4/2004 | Dietz et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Di Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |

(56) References Cited

U.S. PATENT DOCUMENTS

| | | |
|---|---|---|
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0162454 A1 | 7/2007 | D'Albora et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0249820 A1 | 10/2008 | Pathria |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270328 A1 | 10/2008 | Lafferty et al. |
| 2008/0276167 A1 | 11/2008 | Michael |
| 2008/0278311 A1 | 11/2008 | Grange et al. |
| 2008/0281819 A1 | 11/2008 | Tenenbaum et al. |
| 2008/0288306 A1 | 11/2008 | MacIntyre et al. |
| 2008/0288475 A1 | 11/2008 | Kim et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2008/0313281 A1 | 12/2008 | Scheidl et al. |
| 2009/0002492 A1 | 1/2009 | Velipasalar et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0037912 A1 | 2/2009 | Stoitsev et al. |
| 2009/0043801 A1 | 2/2009 | LeClair |
| 2009/0055251 A1 | 2/2009 | Shah et al. |
| 2009/0070162 A1 | 3/2009 | Leonelli et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0234720 A1 | 9/2009 | George et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313463 A1 | 12/2009 | Pang et al. |
| 2009/0318775 A1 | 12/2009 | Michelson et al. |
| 2009/0319891 A1 | 12/2009 | MacKinlay |
| 2010/0004857 A1 | 1/2010 | Pereira et al. |

(56) References Cited

U.S. PATENT DOCUMENTS

| | | |
|---|---|---|
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0004626 A1 | 1/2011 | Naeymi-Rad et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0225650 A1 | 9/2011 | Margolies et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0004904 A1 | 1/2012 | Shin et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |

(56) References Cited

U.S. PATENT DOCUMENTS

| | | |
|---|---|---|
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0197925 A1 | 8/2013 | Blue |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2013/0325826 A1 | 12/2013 | Agarwal et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081685 A1 | 3/2014 | Thacker et al. |
| 2014/0089339 A1 | 3/2014 | Siddiqui et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0227295 A1 | 8/2015 | Meiklejohn et al. |
| 2015/0242401 A1 | 8/2015 | Liu |
| 2015/0254220 A1 | 9/2015 | Burr et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| DE | 102014103482 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 01/025906 | 4/2001 |
| WO | WO 2001/088750 | 11/2001 |

(56) References Cited

FOREIGN PATENT DOCUMENTS

| WO | WO 2002/065353 | 8/2002 |
|---|---|---|
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, pp. 2.
About 80 Minutes, "Palantir in a Number of Parts—Part 6—Graph," Mar. 21, 2013, pp. 1-6.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Ferreira et al., "A Scheme for Analyzing Electronic Payment Systems," Basil 1997.
Galliford, Miles, "SnagIt Versus Free Screen Capture Software: Critical Tools for Website Owners," <http://www.subhub.com/articles/free-screen-capture-software>, Mar. 27, 2008, pp. 11.
Gesher, Ari, "Palantir Screenshots in the Wild: Swing Sightings," The Palantir Blog, Sep. 11, 2007, pp. 1-12.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Glaab et al., "EnrichNet: Network-Based Gene Set Enrichment Analysis," Bioinformatics 28.18 (2012): pp. i451-i457.
Goswami, Gautam, "Quite Writly Said!," One Brick at a Time, Aug. 21, 2005, pp. 7.
"GrabUp—What a Timesaver!" <http://atlchris.com/191/grabup/>, Aug. 11, 2008, pp. 3.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
IBM, "Determining Business Object Structure," IBM, 2004, 9 pages.
JetScreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

(56) References Cited

OTHER PUBLICATIONS

Kitts, Paul, "Chapter 14: Genome Assembly and Annotation Process," The NCBI Handbook, Oct. 2002, pp. 1-21.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents", 6 pages, 2002.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.

Palantir Technologies, "Palantir Labs—Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Quest, "Toad for Oracle 11.6—Guide to Using Toad," Sep. 24, 2012, pp. 1-162.
Rouse, Margaret, "OLAP Cube," <http://searchdatamanagement.techtarget.com/definition/OLAP-cube>, Apr. 28, 2012, pp. 16.
Schroder, Stan, "15 Ways to Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records_Investigations into Arms Dealing," Oct. 29, 2010, pp. 1-10.
Yang et al., "HTML Page Analysis Based on Visual Cues", A129, pp. 859-864, 2001.
Zheng et al., "GOEAST: a web-based software toolkit for Gene Ontology enrichment analysis," Nucleic acids research 36.suppl 2 (2008): pp. W385-W363.
Notice of Acceptance for Australian Patent Application No. 2013251186 dated Nov. 6, 2015.
Notice of Acceptance for Australian Patent Application No. 2014250678 dated Oct. 7, 2015.
Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 13/247,987 dated Mar. 17, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.

(56) References Cited

OTHER PUBLICATIONS

Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14187996.5 dated Feb. 19, 2016.
Official Communication for European Patent Application No. 14189344.6 dated Feb. 20, 2015.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.

(56) References Cited

OTHER PUBLICATIONS

Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 2, 2016.
Official Communication for U.S. Appl. No. 13/669,274 dated May 6, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/831,791 dated Feb. 11, 2016.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/835,688 dated Sep. 30, 2015.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/222,364 dated Dec. 9, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Sep. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.

(56) References Cited

OTHER PUBLICATIONS

Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/332,306 dated May 20, 2016.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/479,160 dated Apr. 20, 2016.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/631,633 dated Sep. 10, 2015.
Official Communication for U.S. Appl. No. 14/631,633 dated Feb. 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/715,834 dated Apr. 13, 2016.
Official Communication for U.S. Appl. No. 14/715,834 dated Feb. 19, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/841,338 dated Feb. 18, 2016.
Official Communication for U.S. Appl. No. 14/842,734 dated Nov. 19, 2015.

(56) References Cited

OTHER PUBLICATIONS

Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/961,481 dated Mar. 2, 2016.
Official Communication for U.S. Appl. No. 14/975,215 dated May 19, 2016.
Restriction Requirement for U.S. Appl. No. 13/839,026 dated Apr. 2, 2015.
Notice of Allowance for U.S. Appl. No. 14/871,465 dated Jul. 19, 2016.
Official Communication for European Patent Application No. 15188106.7 dated Feb. 21, 2017.
Official Communication for U.S. Appl. No. 14/871,465 dated Apr. 11, 2016.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

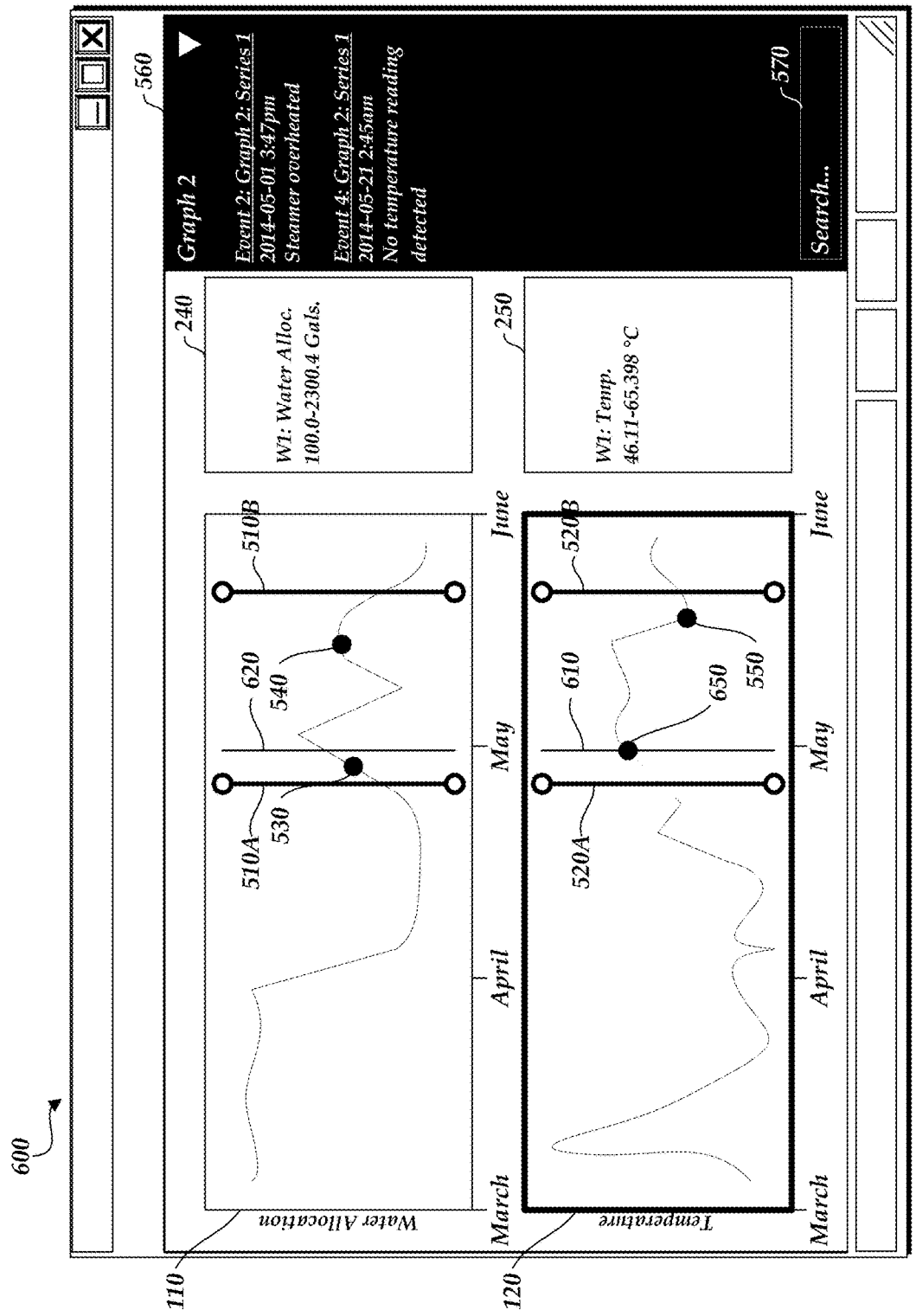

WELL #1 — 1000

WELL #1 / Producer — 1010, 1020

Profile
Well Communication
Map

Sensors
Oil/Gas/Water

History and Events
Well Work
Comments

CPI
Comp. Diagram

| | |
|---|---|
| Spud Date: | March 1, 2000 12:00:00 -00:00 |
| Completion Date: | August 2, 2000 16:35:00 -00:00 |
| Water Depth: | 100m |
| Well Length: | 10m |
| True Vertical Depth: | 160m |
| Region: | West |
| Field: | Chamber |
| Platform: | Jane |
| Block: | 5 |
| Slot: | 12 |
| Objectives: | To start production |

| | |
|---|---|
| WELL #1 1010 | Well #2 1020 |
| | Injector |
| Profile | |
| Well Communication | Spud Date: March 1, 2000 12:00:00 -00:00 |
| Map | Completion Date: August 2, 2000 16:35:00 -00:00 |
| | Water Depth: 100m |
| Sensors | Well Length: 10m |
| Oil/Gas/Water | True Vertical Depth: 160m |
| History and Events | |
| Well Work | Region: West |
| Comments | Field: Chamber |
| | Platform: Jane |
| CPI | Block: 5 |
| Comp. Diagram | Slot: 12 |
| | |
| | Objectives: Drill water injector in field |

TIME-SERIES ANALYSIS SYSTEM

CROSS-REFERENCE TO RELATED APPLICATIONS

This application is a continuation of U.S. patent application Ser. No. 14/871,465, filed on Sep. 30, 2015, entitled "TIME-SERIES ANALYSIS SYSTEM", which claims priority under 35 U.S.C. § 119(e) to U.S. Provisional Application No. 62/059,601, entitled "CHRONICLE TIME-SERIES ANALYSIS SYSTEM" and filed on Oct. 3, 2014, and U.S. Provisional Application No. 62/206,159, entitled "TIME-SERIES ANALYSIS SYSTEM" and filed on Aug. 17, 2015, which are hereby incorporated by reference in their entireties.

TECHNICAL FIELD

The present disclosure relates to systems and techniques for querying databases and displaying queried data in an interactive user interface.

BACKGROUND

A database may store a large quantity of data. For example, a system may comprise a large number of sensors that each collect measurements at regular intervals, and the measurements may be stored in the database and/or a system of databases. The measurement data can be supplemented with other data, such as information regarding events that occurred while the system was operational, and the supplemental data can also be stored in the database and/or the system of databases.

In some cases, a user may attempt to analyze a portion of the stored data. For example, the user may attempt to analyze a portion of the stored data that is associated with a specific time period. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for displaying various graphs in an interactive user interface in substantially real-time in response to input from a user in order to determine information related to measured data points and provide the determined information to the user in the interactive user interface. For example, a computing device may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges. The user interface may also be interactive in that a user may select a portion of a graph (e.g., data across a certain time period) to view tangential data related to the selection (e.g., events that occurred during a time period represented by the selection).

The various systems described herein may maximize or enhance the speed and accuracy of data displayed in user interfaces using zoom level specific caching. For example, depending on a zoom level of data displayed, individual pixels represent different time ranges (e.g., 1 day in February, 1 week in February, 1 month in 2014, etc.). Over the time range of an individual pixel, the computing system may determine a maximum value and a minimum value of the data to be displayed in the graph. The determined minimum and maximum values may then be cached, such that they are available in the future when that same zoom level is requested by the user or other users, saving the system from recalculation of the same minimum and maximum value to include on the chart (possibly from multiple data points at each pixel time range). For each individual pixel, a line may be rendered from the maximum value to the minimum value. If the granularity of the measured data matches the time range of an individual pixel, then the maximum value and the minimum value may be the same. In one embodiment, the computing system may display the graph at the closest zoom level at which maximum and minimum values have been cached to ensure that the cached data can be used effectively.

One aspect of the disclosure provides a computing system configured to access one or more databases in substantially real-time in response to input from a user provided in an interactive user interface in order to determine information related to measured data points and provide the determined information to the user in the interactive user interface. The computing system comprises a computer processor. The computing system further comprises a database storing at least first sensor values for a first sensor at each of a plurality of times and second sensor values for a second sensor at each of a plurality of times. The computing system further comprises a computer readable storage medium storing program instructions configured for execution by the computer processor in order to cause the computing system to generate user interface data for rendering the interactive user interface on a computing device, the interactive user interface including a first container and a second container, where the first container includes a first graph and the second container includes a second graph, where the first container and the second container have a same width, where the first graph includes first sensor values for the first sensor over a first time period and the second graph includes second sensor values for the second sensor over a second time period that is shorter than the first time period, and wherein portions of the first graph and the second graph are each selectable by the user; receive an identification of a selection by the user of a first data point in the first graph, where the first data point corresponds to a first time range; update the user interface data such that the interactive user interface includes a first marker at a location of the first data point in the first graph; access the database to determine a second sensor value that corresponds to a beginning of the first time range and a second sensor value that corresponds to an end of the first time range; and update the user interface data to include a second marker at a location of a second data point in the second graph that corresponds to the beginning of the first time range and a third marker at a location of a third data point in the second graph that corresponds to the end of the first time range.

The computing system of the preceding paragraph can have any sub-combination of the following features: where the instructions are further configured to cause the computing system to: receive an indication from the user of a change to the first time period in the first graph, in response to receiving the indication from the user of the change to the first time period, adjust positions of the first and second markers indicating the first time period in the second graph; where the computer readable storage medium further stores program instructions that cause the computing system to update the user interface data to include a third container, where the third container includes a list of events that occurred within the first time range; where the first graph, for each event that occurred within the first time range, includes a mark that indicates a data point on the first graph that corresponds with a time that the respective event occurred; where the computer readable storage medium further stores program instructions that cause the computing system to update the user interface data to include a marker at a location in the first graph corresponding to a first event in the list of events in response to selection by the user of a location in the third container that corresponds to the first event; where the computer readable storage medium further stores program instructions that cause the computing system to: receive an indication by the user of a selection in the first graph at a fourth data point such that a new event is added at a time that corresponds with the fourth data point, and update the user interface data such that the third container includes an identification of the new event; where the computer readable storage medium further stores program instructions that cause the computing system to: receive an indication by the user that the new event corresponds with the first graph, and update the user interface data such that a first mark is displayed in the first graph at the time that corresponds with the fourth data point; where the computer readable storage medium further stores program instructions that cause the computing system to: receive an indication by the user that the new event corresponds with the second graph, and update the user interface data such that a first mark is displayed in the second graph at the time that corresponds with the fourth data point; where the computer readable storage medium further stores program instructions that cause the computing system to: receive an indication by the user that the new event corresponds with the first graph and the second graph, and update the user interface data such that a first mark is displayed in the first graph at the time that corresponds with the fourth data point and in the second graph at the time that corresponds with the fourth data point; where the computer readable storage medium further stores program instructions that cause the computing system to: receive an indication of selection by the user of a first event in the list of events, and update the user interface data such that the first graph includes an icon at a position of a data point in the first graph that corresponds with the first event; where the computer readable storage medium further stores program instructions that cause the computing system to: receive an indication of selection, by the user, of a first location corresponding to the first time in the first graph, and update the user interface data such that the first graph includes a marker at the location in the first graph corresponding to the first time; where the computer readable storage medium further stores program instructions that cause the computing system to update the user interface data such that the second graph includes a second marker at a location in the second graph corresponding to the first time; where the computer readable storage medium further stores program instructions that cause the computing system to: receive an indication of selection, by the user of a second location corresponding to a second time in the first graph, and update the user interface data such that the first graph includes the marker at the second location in the first graph corresponding to the second time; where the computer readable storage medium further stores program instructions that cause the computing system to update the user interface data such that the second graph includes the second marker at a location in the second graph corresponding to the second time; where the first data point comprises a line from a location in the first graph that corresponds with a highest value measured by the first sensor during the first time range to a location in the first graph that corresponds with a lowest value measured by the first sensor during the first time range; where the computer readable storage medium further stores program instructions that cause the computing system to receive an indication that a zoom level of the first graph is adjusted from a first zoom level to a second zoom level; where the computer readable storage medium further stores program instructions that cause the computing system to retrieve, from a cache, for a second time range that corresponds to a first pixel in an x-axis of the first graph, a highest value measured by the first sensor during the second time range and a lowest value measured by the first sensor during the second time range; where the computer readable storage medium further stores program instructions that cause the computing system to update the user interface data such that the first graph includes a line from a location in the first graph that corresponds with the highest value to a location in the first graph that corresponds with the lowest value; where the first sensor and the second sensor are oil well sensors; and where the first sensor values correspond to oil extracted from an oil well, and where the second sensor values correspond to water extracted from the oil well.

The present disclosure also comprises a computer program product, for example a non-transitory or transitory computer-readable medium, that comprises the program instructions recited in any of the appended claims, and/or comprises the program instructions disclosed in the present description. The present disclosure further comprises a method in which the steps recited in any of the appended claims, and/or the steps disclosed in the present description, are executed by one or more computing devices.

BRIEF DESCRIPTION OF THE DRAWINGS

FIGS. 6A-C illustrate another user interface that displays the first time-series graph and the second time-series graph of FIG. 1.

FIGS. 10A-D illustrate a user interface that displays the first time-series graph and the second time-series graph of FIG. 1.

FIGS. 11A-D illustrate another user interface that displays interactive information about an oil well.

DETAILED DESCRIPTION OF SPECIFIC EMBODIMENTS

Overview

Figure 1:
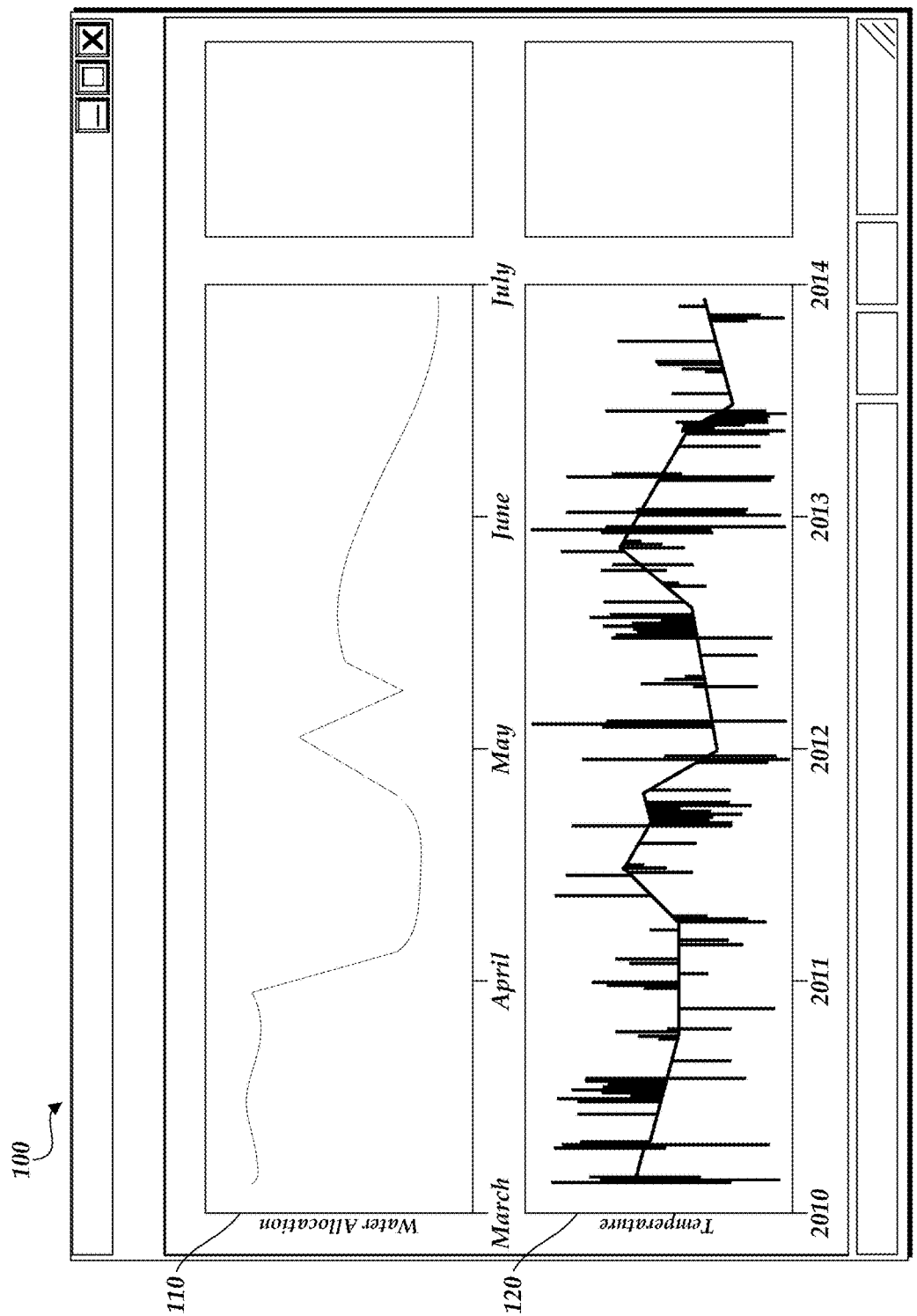
FIG. 1 illustrates a user interface that displays a first time-series graph and a second time-series graph.

As described above, it can become very difficult for the user to identify relevant data and perform an analysis when a database and/or a system of databases includes a large amount of data. This may be especially true if the user would like to compare two or more data sets over a specific period of time, where the data sets correspond to measurements taken by sensors in a system. In conventional systems, user interfaces may be generated that allow the user to view graphs of the data sets. However, it may be difficult or burdensome for the user to try to identify trends in the data and/or determine the reasons why a sensor acted in a given manner.

Accordingly, disclosed herein are various systems and methods for displaying various graphs in an interactive user interface. For example, a computing device (e.g., the computing system 1400 of FIG. 14 described below) may be configured to retrieve data from one or more databases and generate one or more interactive user interfaces. The one or more interactive user interfaces may display the retrieved data in one or more graphs, such as time-series or scatterplots. The user interface may be interactive in that a user may manipulate one graph, which causes an identical or nearly identical manipulation of another displayed graph in real-time. The manipulations may occur even if the displayed graphs include data across different time ranges. The user interface may also be interactive in that a user may select a portion of a graph (e.g., data across a certain time period) to view tangential data related to the selection (e.g., events that occurred during a time period represented by the selection).

The data in the graphs may be rendered in the interactive user interfaces according to a technique that efficiently uses the pixels that are available for displaying the graphs. For example, every individual pixel (in the x-axis of an x-y graph) may represent a time range (e.g., 1 day in February, 1 week in February, 1 month in 2014, etc.). Over the time range of an individual pixel, the computing system may determine a maximum value and a minimum value of the data to be displayed in the graph. If the granularity of the measured data matches the time range of an individual pixel (e.g., an individual pixel represents a time range of 1 hour and data was measured every hour), then the maximum value and the minimum value may be the same. For each individual pixel (in the x-axis), a line may be rendered from the maximum value to the minimum value (in the y-axis).

As described above, the graphs may be manipulated by the user. For example, the user may zoom into a portion of a graph. In an embodiment, the computing system predetermines each possible zoom level (or at least most commonly used zoom levels) and pre-calculates the maximum and minimum values for time periods associated with the minimum display resolution (e.g., each individual pixel in the x-axis may be associated with a time period) at separate possible zoom level. These pre-calculated maximum and minimum values may be cached, such that they may be retrieved as a user adjusts zoom levels in order to more rapidly update the graph to include the most granular data available at the particular zoom level. In one embodiment, if the user selects a zoom level having minimum time periods per pixel (or some other display unit) that has not been pre-cached, the computing system may display the graph at the closest zoom level at which maximum and minimum values have been cached to ensure that the cached data can be used effectively.

In some embodiments, the interactive user interfaces may include information about a system and sensors associated with the system. For example, the interactive user interfaces may include time-series graphs that display data measured by sensors associated with an oil well. The time-series (and/or any other graphs displayed in the user interface) may be manipulated by the user in any manner as described herein. While the disclosure is described herein with respect to time-series data measured by sensors associated with an oil well, this is not meant to be limiting. The various graphs described herein can depict any time-series data measured by sensors, not just sensors associated with an oil well. For example, the various graphs described herein can depict time-series data measured by outdoor or indoor temperature sensors, humidity sensors, sensors that measure water levels, sensors that measure traffic congestion, sensors that detect seismic activity, and/or the like. Furthermore, the various graphs described herein can depict any type of time-series data, not just time-series data derived from a sensor. For example, the various graphs described herein can depict healthcare data (e.g., pharmaceutical batch failure data over time, the number of claims filed over time, etc.), financial data (e.g., the price of a stock over time), polling data (e.g., the number of respondents that view an issue favorably in polls conducted over a period of time), census information (e.g., the population of a city over time), and/or the like. The time-series data depicted in the graphs and derived from any source can be manipulated by the user in any manner as described herein.

The systems and methods described herein may provide several benefits. For example, the systems and methods described herein may improve the usability of the user interface by providing graphs that can be manipulated by a user in a concurrent manner, thereby allowing the user to identify trends or other information associated with the graphs without having to separately manipulate each individual graph. As another example, the systems and methods described herein may reduce the processor load while the user is interacting with the user interfaces by predetermining each possible zoom level and pre-calculating the maximum and minimum values. The systems and methods described herein may also increase the processing speed as the computing system may not have to determine in real-time how a graph should be updated when the zoom level is changed. Rather, the computing system can retrieve the appropriate data from the cache to update the graph. As another example, the systems and methods described herein may reduce the latency in generating updated user interfaces as the zoom levels and maximum and minimum values may be predetermined and can be retrieved from cache rather than the databases that store the actual data (e.g., which could be located externally from the computing system). Thus, the systems and methods described herein may improve the usability of the user interface.

Examples of Manipulating Time-Series Graphs in an Interactive User Interface

FIG. 1 illustrates a user interface 100 that displays a time-series graph 110 and a time-series graph 120. As illustrated in FIG. 1, the time-series graph 110 plots water allocation data across several months. The time-series graph 120 plots temperature data across several years. While the time-series graph 110 and the time-series graph 120 are each illustrated as plotting a single type of data, this is merely for simplicity and not meant to be limiting. The time-series graph 110 and/or the time-series graph 120 can plot multiple types of data simultaneously. For example, the time-series graph 110 can plot both water allocation data across several months and bottomhole pressure data for the same time period. The depicting of the plotted data can be varied to distinguish between the different types of data plotted in a single time-series graph. The time-series graph 110 and/or 120 plots may be resized vertically, horizontally, diagonally, and/or the like. In an embodiment, not shown, the user interface 100 may include a button that, when selected, causes the computing system that generates the user interface 100 to request current or updated data from an external source for display in the graph 110 and/or the graph 120. In some embodiments, the water allocation data and the temperature data are measured by sensors associated with the same system (e.g., an oil well).

In an embodiment, the water allocation data was measured at a granularity that matches each individual pixel in the x-axis of the time-series graph 110. Thus, the maximum and minimum values of the water allocation data at each individual pixel may be the same and a single point (the size of a pixel in the x and y direction) may represent each water allocation measurement.

The temperature data, however, may be measured at a granularity that does not match each individual pixel in the x-axis of the time-series graph 120. For example, the temperature may have been measured every day, yet each individual pixel may represent a 2 week time period. Thus, the computing system that generates the user interface 100 may calculate the maximum and minimum temperature values for each 2 week time period between the beginning and the end of the time range associated with the time-series graph 120 (e.g., 2010 to 2014). For each individual pixel in the x-axis of the time-series graph 120, a line may be rendered from the maximum temperature value to the minimum temperature value.

Figure 2A:
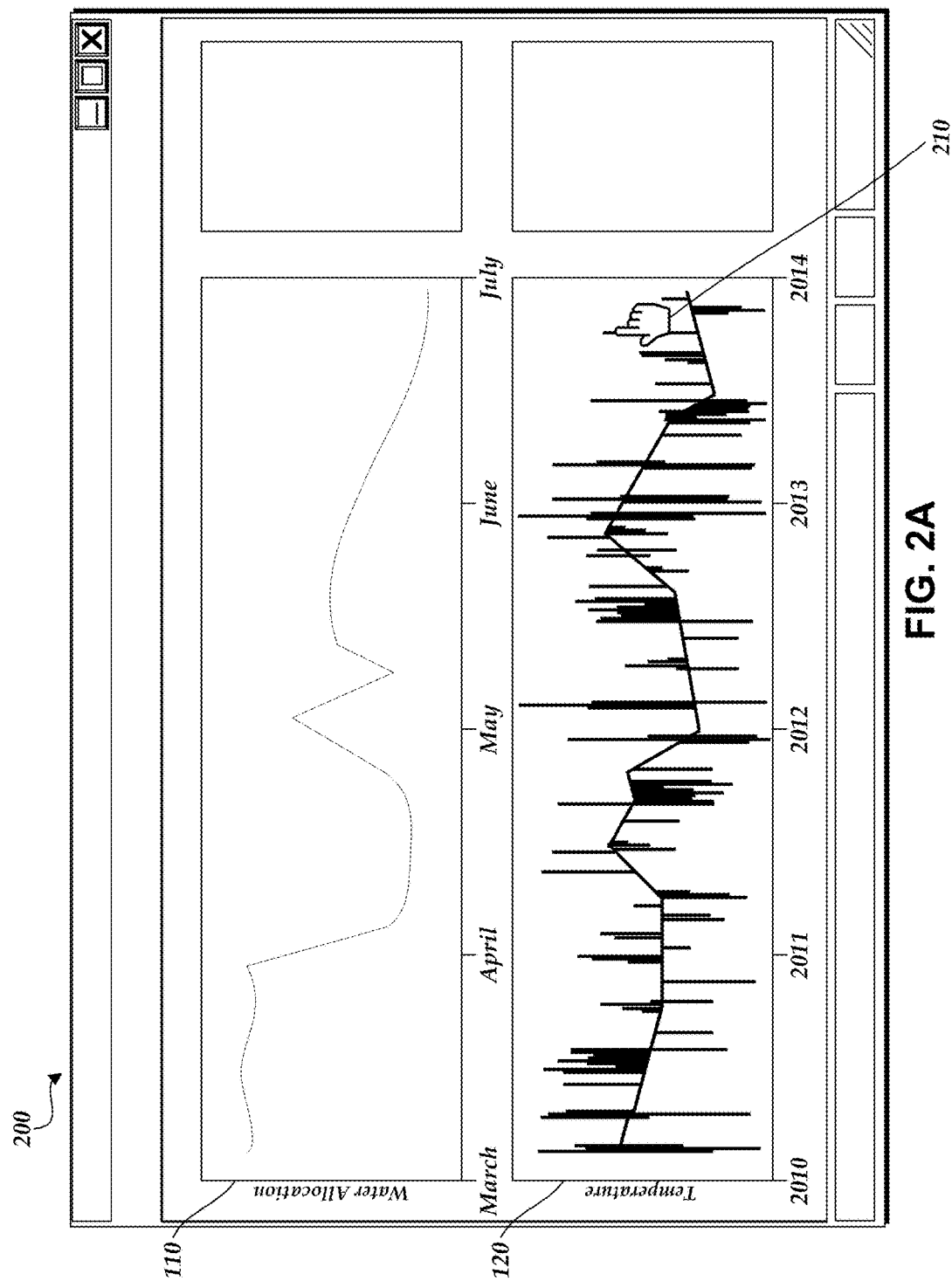
FIGS. 2A-B illustrate another user interface that displays the first time-series graph and the second time-series graph of FIG. 1.
Figure 2B:
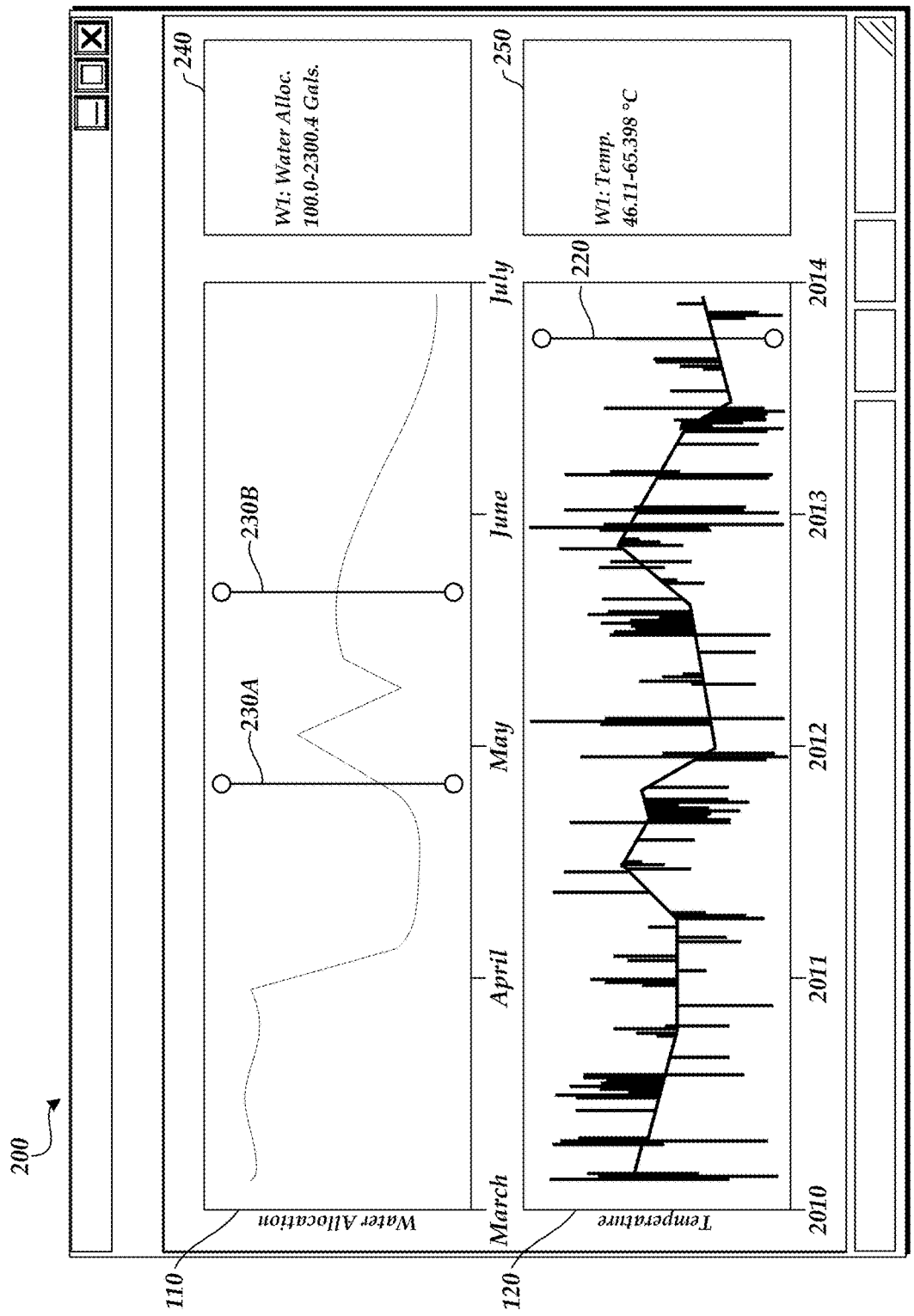

FIGS. 2A-2B illustrate another user interface 200 that displays the time-series graph 110 and the time-series graph 120. As illustrated in FIG. 2A, a user may place a cursor 210 (e.g., a mouse pointer, a finger, etc.) over a portion of the time-series graph 120. For example, the user may select the portion of the time-series graph 120 at the location of the cursor 210. Because the temperature data may be measured at a granularity that does not match each individual pixel, the selected portion of the time-series graph 120 may correspond to a first time period (e.g., 1 month in the year 2013). Thus, selection of the portion of the time-series graph 120 at the location of the cursor 210 may include selecting all temperature values within the first time period.

In an embodiment, selection of the portion of the time-series graph 120 at the location of the cursor 210 causes a marker 220 to appear at the selection in the time-series graph 120, as illustrated in FIG. 2B. Furthermore, the selection of the portion of the time-series graph 120 at the location of the cursor 210 may cause a corresponding selection to be made and displayed in the time-series graph 110, e.g., water allocation data recorded over a same time period as is represented by the marker 220 with reference to temperate data. For example, markers 230A and 230B may be displayed in the time-series graph 110. The selection in the time-series graph 110 may correspond to the selection in the time-series graph 120 in that the water allocation values between markers 230A and 230B may have been measured over the first time period (e.g., during the same month in 2013 selected by marker 220).

The user interface 200 may further include a window 240 where users can provide or view notes associated with a particular sensor data or with sensor data at a particular time or time period. In the example of FIG. 2B, the window 240 includes notes associated with both graphs 110 and 120 during the selected time period, but as discussed further below, the user can choose to have note information on only a single chart displayed. In some embodiments, the notes can include actual measurement data associated with the corresponding graph. For example, in the embodiment of FIG. 2B, the window 240 includes water allocation maximum and minimum data during the selected time period, while window 250 includes temperature data for the selected time period.

Figure 3A:
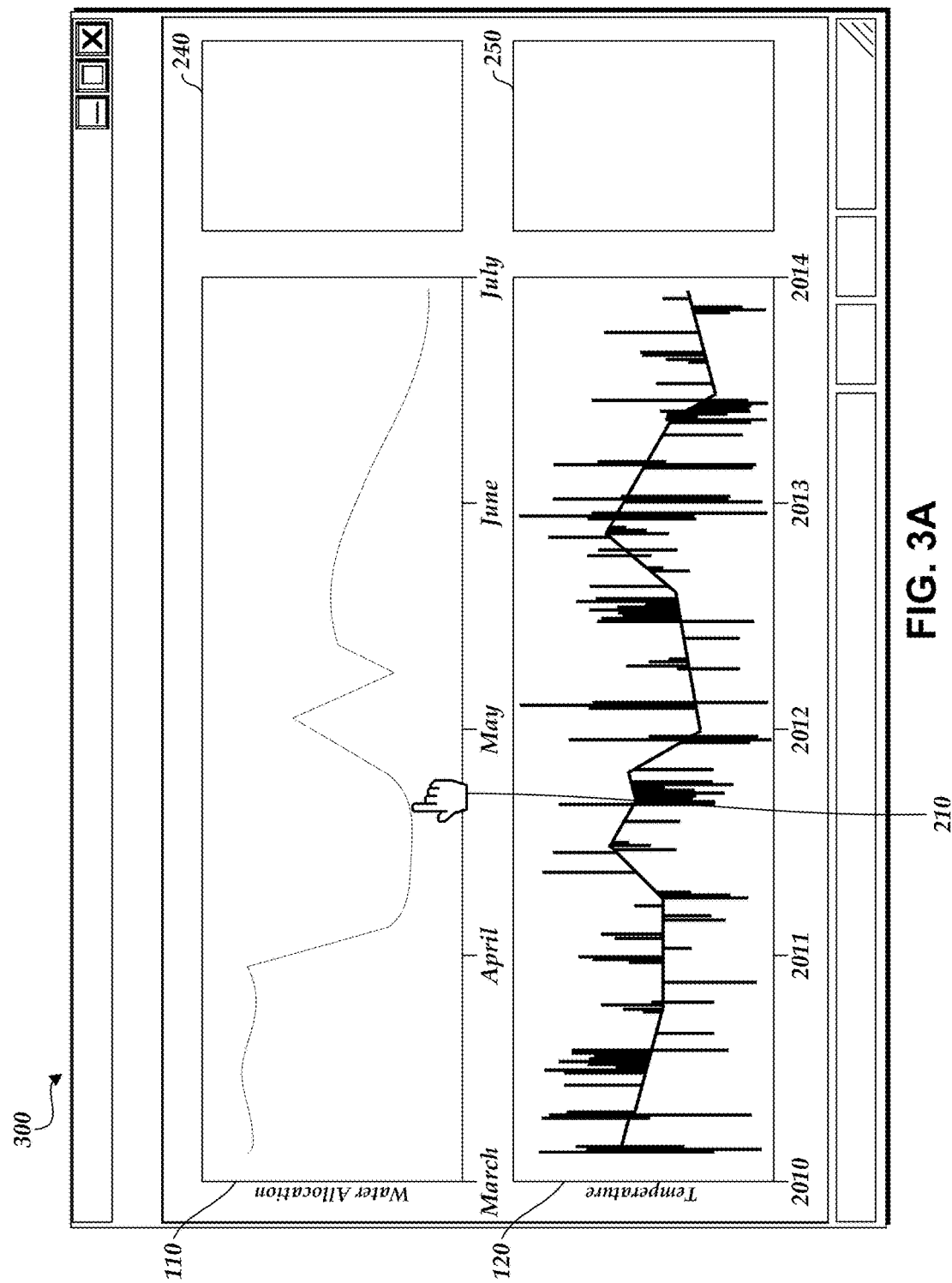
FIGS. 3A-3D illustrate another user interface that displays the first time-series graph and the second time-series graph of FIG. 1.
Figure 3B:
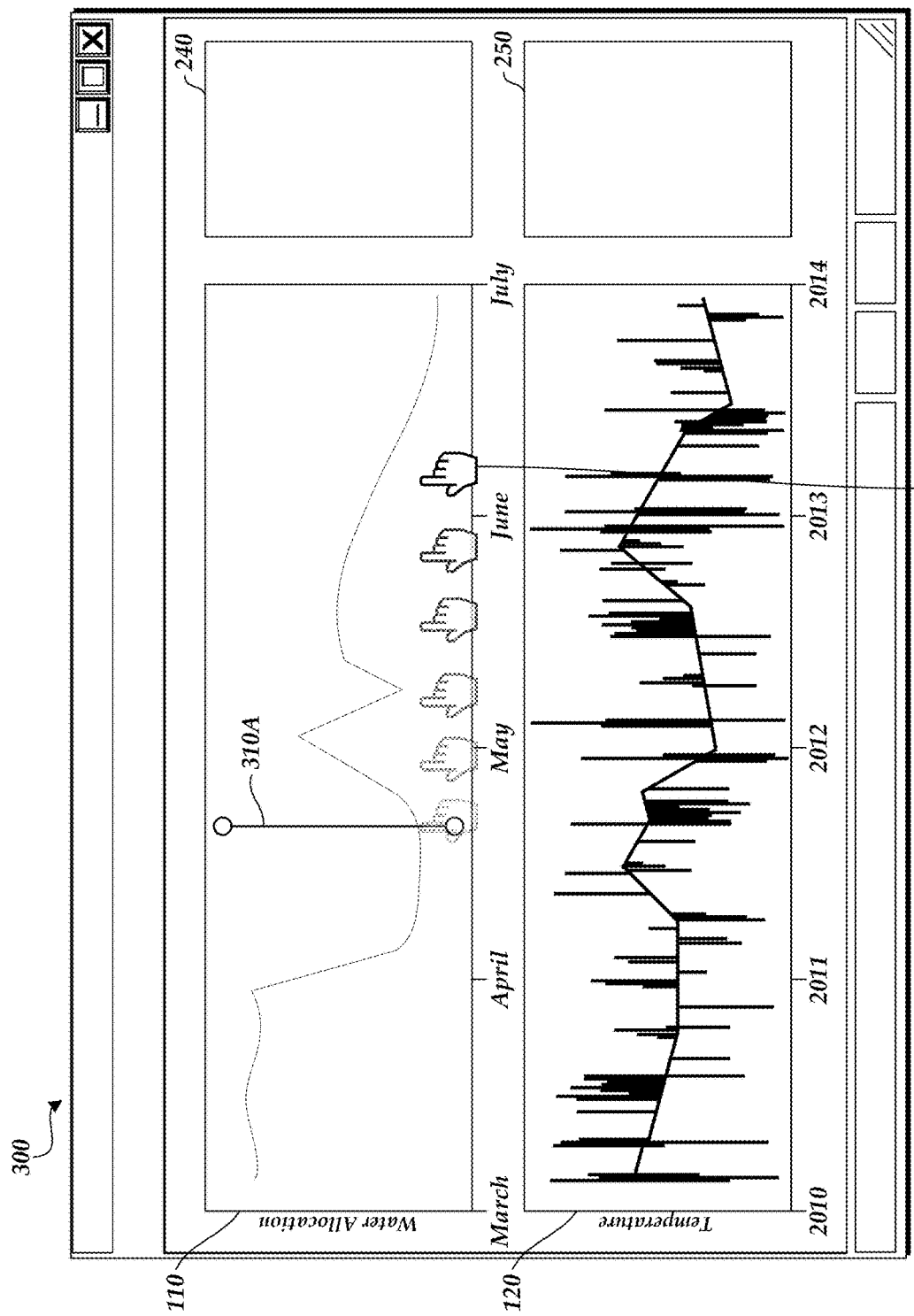
Figure 3C:
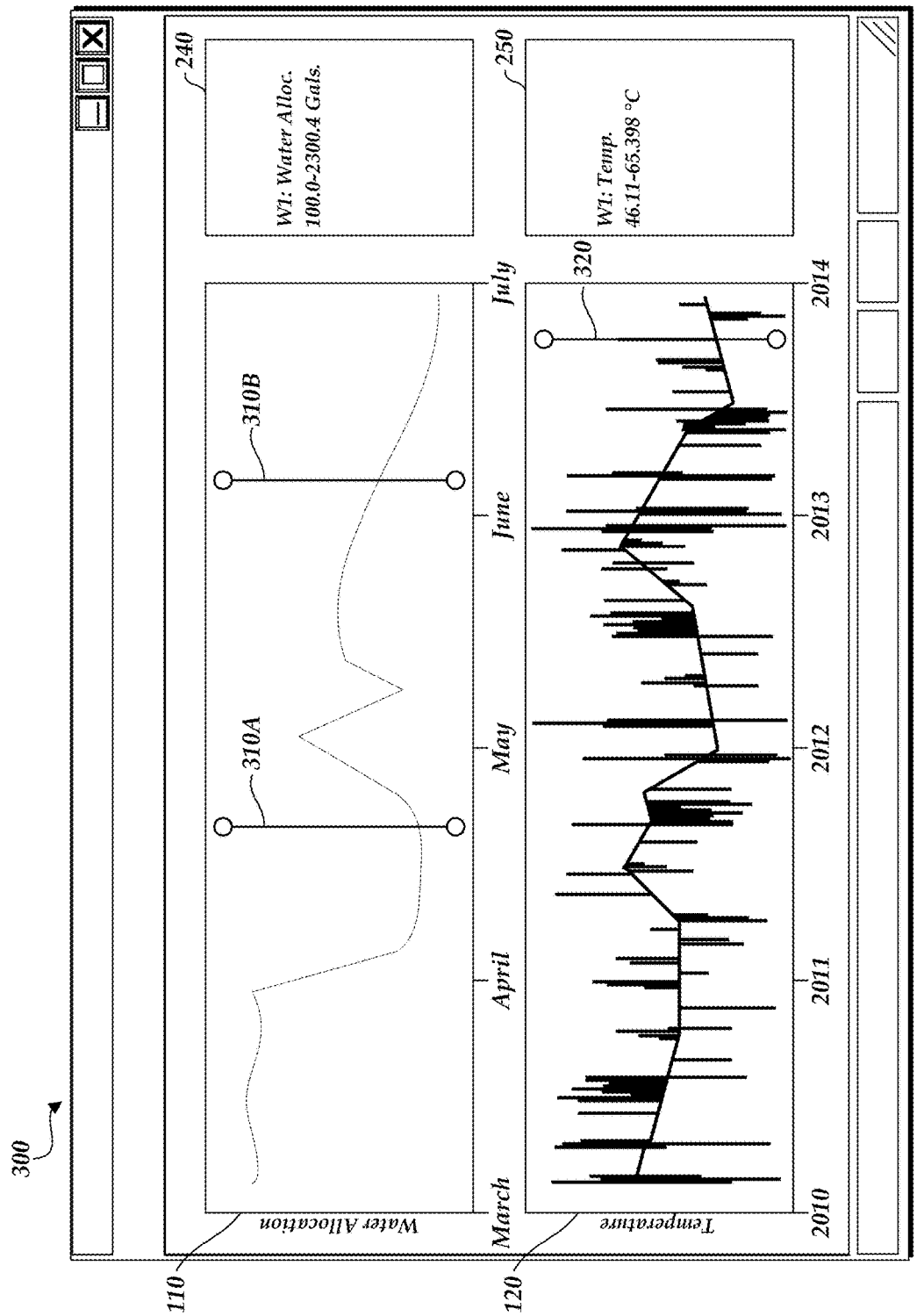

FIGS. 3A-3D illustrate another user interface 300 that displays the time-series graph 110 and the time-series graph 120. As illustrated in FIG. 3A, a user may place the cursor 210 over a portion of the time-series graph 110. For example, the user may begin to select a portion of the time-series graph 110 at the location of the cursor 210. As illustrated in FIG. 3B, the user may drag the cursor 210, while the time-series graph 110 is selected, from left to right to complete the selection at the new location of the cursor 210. As the user is dragging the cursor 210, a marker 310A may appear in the time-series graph 110 to indicate where the selection began.

In an embodiment, as the selection of the end of the desired time period is made in graph 110, a second marker 310B appears in the time-series graph 110 to indicate an end of the time period, and marker 320 (or possibly two markers showing start and end of the time period, if the scale of graph 120 is such that the time period includes multiple pixels) is updated in response to changes in the time period selected in graph 110 such that the markers in each graph 110 and 120 indicate the same time period, even though the time series graphs are on a different time scale. Thus, the selected time period in the time-series graph 110 with reference to water allocation is automatically used to select a corresponding time period in the time-series graph 120 with reference to temperature values.

The user may indicate that all graphs or just a subset of graphs displayed in the user interface 300 should be synchronized or identically manipulated in a manner described herein (e.g., an identical manipulation such as a selection of a time period in one graph causing a selection of a corresponding time period in another graph). For example, if the user interface 300 displayed a third graph, the user may be provided with an option to synchronize the graph 110, the graph 120, and the third graph, the graph 110 and the third graph, or the graph 120 and the third graph. If, for example, the user selected to synchronize the graph 120 and the third graph, then any changes to the third graph by the user may also occur to the graph 120, but not to the graph 110. Likewise, any changes to the graph 110 by the user would not affect the graph 120 or the third graph.

Figure 3D:
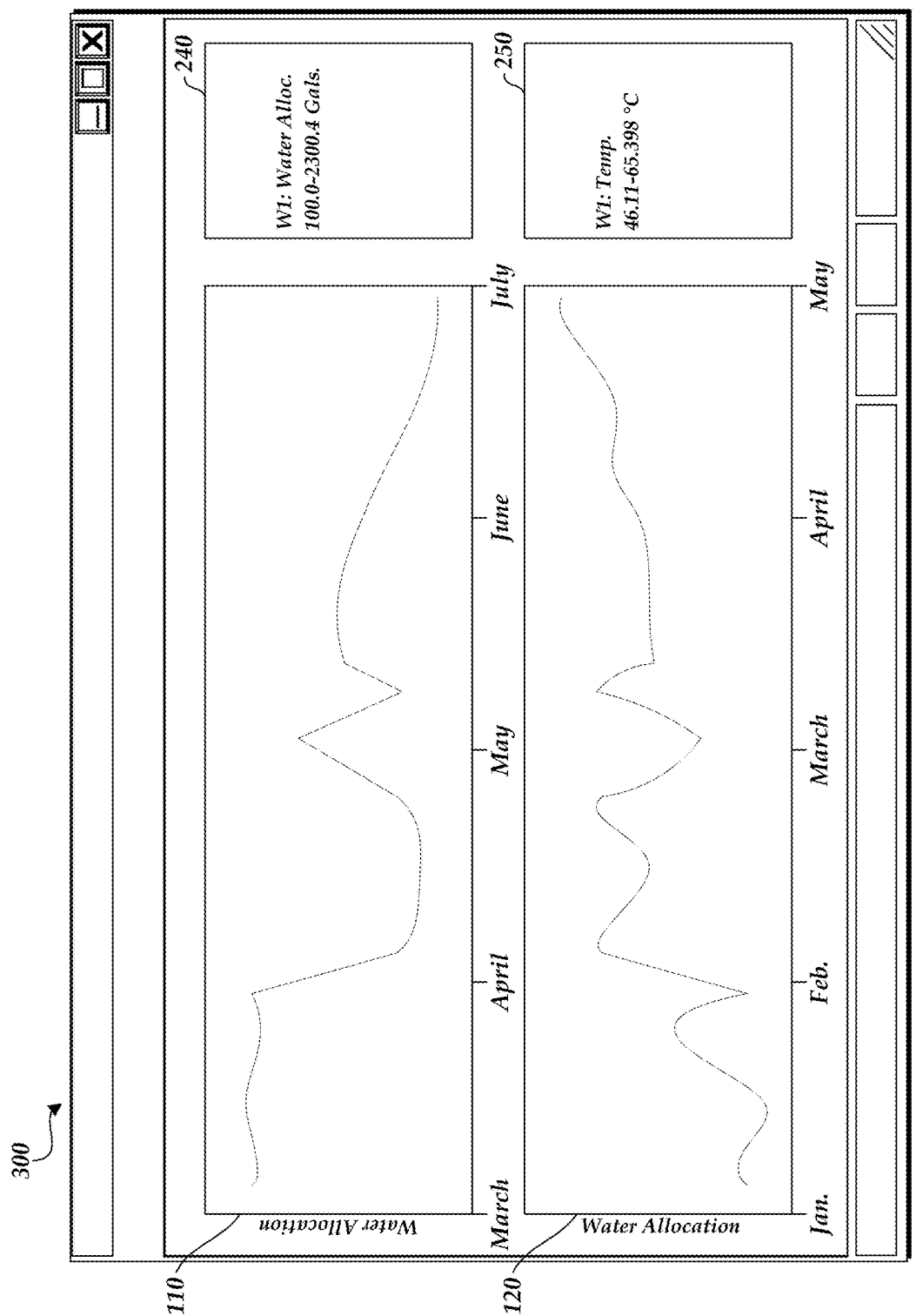

In further embodiments, the user may elect to synchronize certain manipulations of a graph, but not other manipulations of a graph. For example, the user may select an option to synchronize the zoom level in two or more graphs, but not the time period displayed within the graphs. As illustrated in FIG. 3D, the user has selected an option to synchronize the zoom levels in the graph 110 and the graph 120 (e.g., the x-axis for both graphs 110 and 120 is at the same zoom level), however each graph is displaying data at a different period of time (e.g., the x-axis for graph 110 ranges from March to July and the x-axis for graph 120 ranges from January to May). If the user, for example, places a marker in the graph 110, the marker may appear in the graph 120 if the marker is placed at a time that appears on the x-axis for the graph 120 (e.g., if the marker is placed on April 1st, which also appears on the x-axis in the graph 120). If the user, as another example, manipulates the graph 110 by scrolling to the right, the graph 120 may be manipulated in the same way.

Figure 4A:
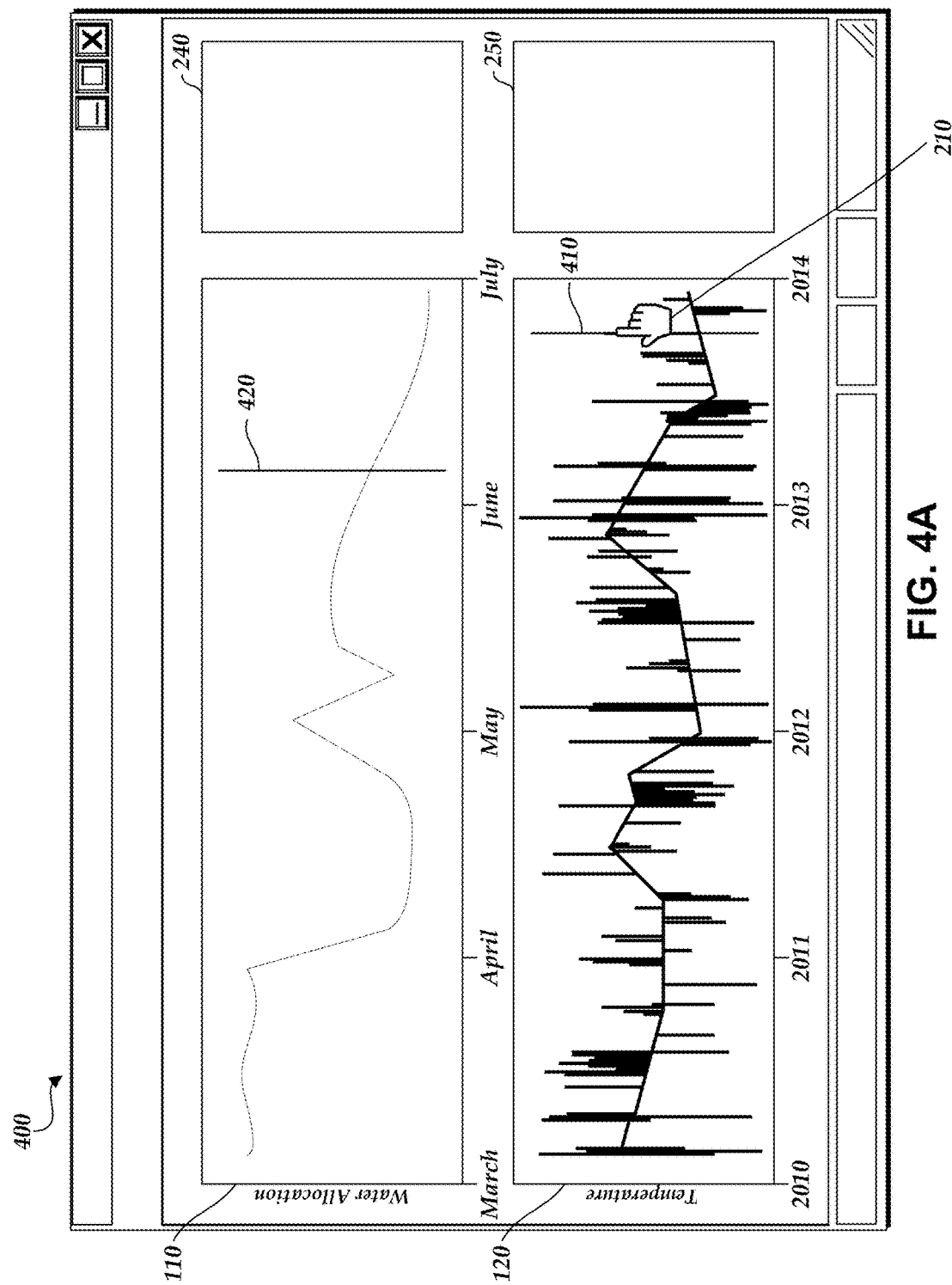
FIGS. 4A-C illustrate another user interface that displays the first time-series graph and the second time-series graph of FIG. 1.
Figure 4B:
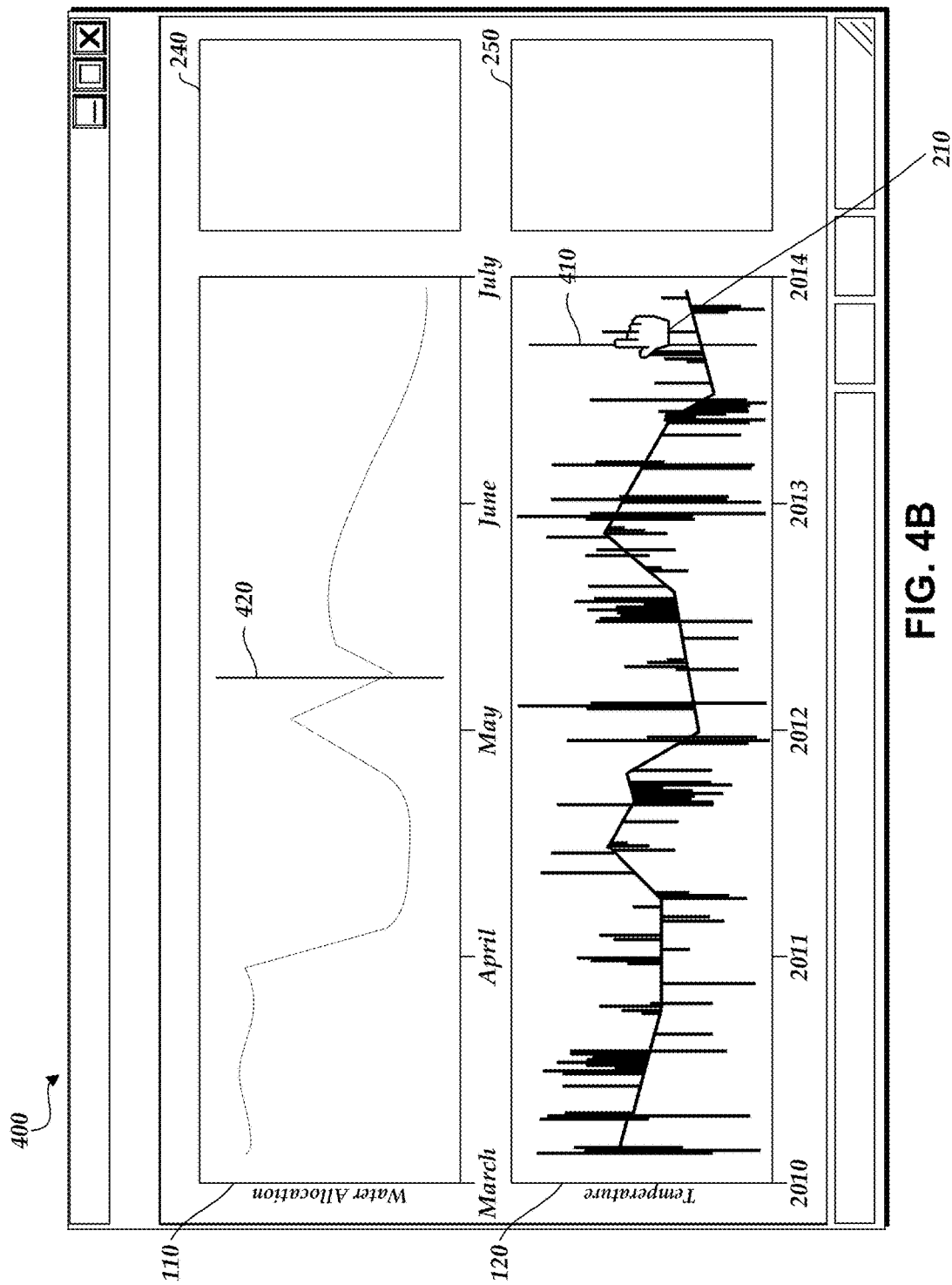
Figure 4C:
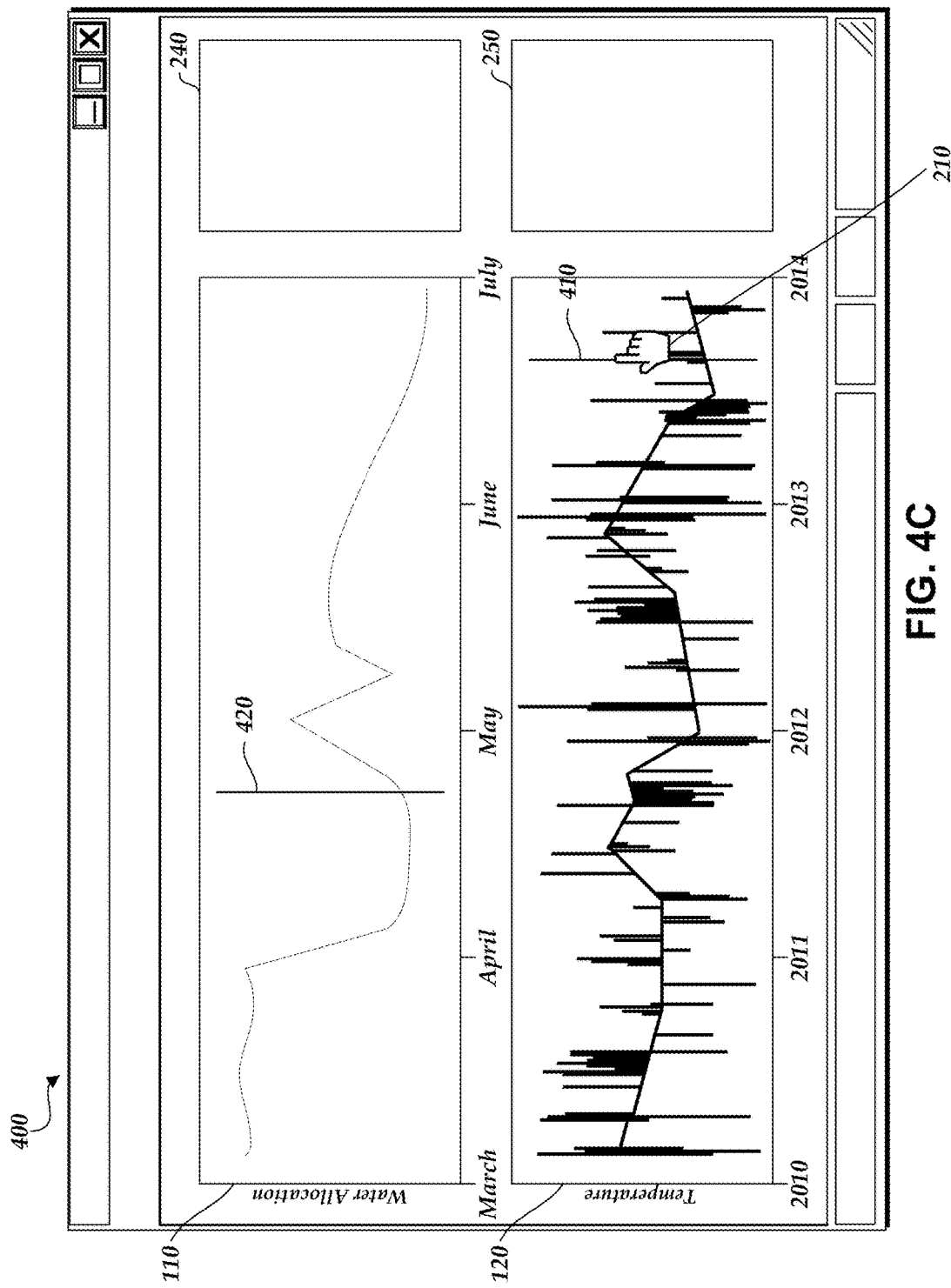

FIGS. 4A-4C illustrate another user interface 400 that displays the time-series graph 110 and the time-series graph 120. As illustrated in FIG. 4A, a user may place the cursor 210 over a portion of the time-series graph 120. For example, the user may hover over the portion of the time-series graph 120 at the location of the cursor 210. Hovering over the time-series graph 120 may cause the computing system to generate a marker 410 that is displayed in the time-series graph 120 at the location of the cursor 210, and which can be moved in response to movement, by the user, of the hovering cursor 210 over other portions of the graph 120. In addition, a corresponding marker 420 may be displayed in the time-series graph 110. The marker 420 may be located at a location in the time-series graph 110 that represents a water allocation value that was measured at a same time as a temperature value that falls within the time period represented by the marker 410.

In an embodiment, as the user moves the cursor 210 to different locations within the time-series graph 120, the marker 410 may follow the cursor 210. Furthermore, as illustrated in FIGS. 4B-4C, the marker 420 may also move such that the marker 420 continues to correspond to the marker 410 in a manner as described above. Because time scales of the two time-series graphs 110 and 120 are different, movement of the marker 420 may move at a faster rate than movement of the marker 410.

Figure 5A:
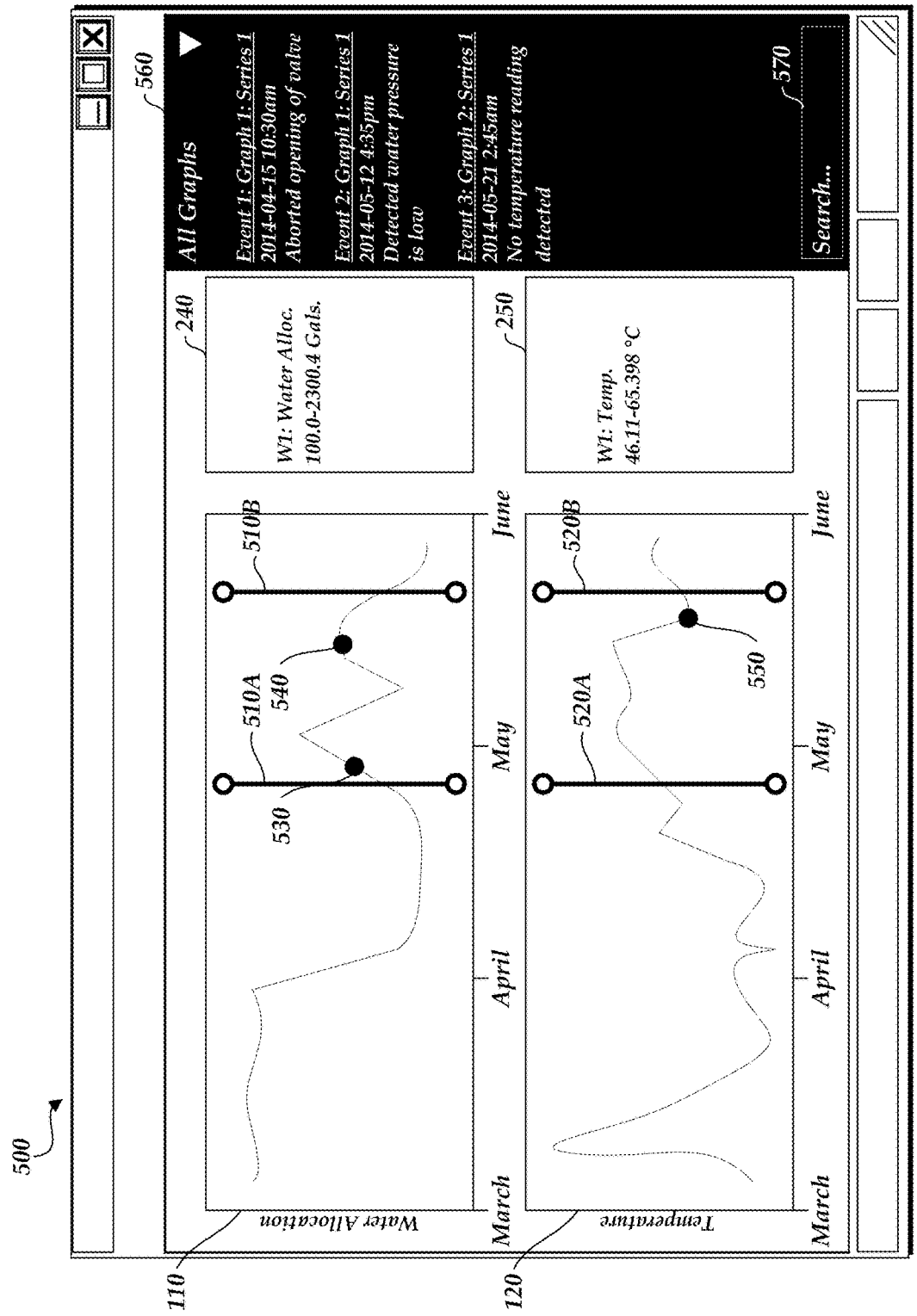
FIGS. 5A-B illustrate another user interface that displays the first time-series graph and the second time-series graph of FIG. 1.
Figure 5B:
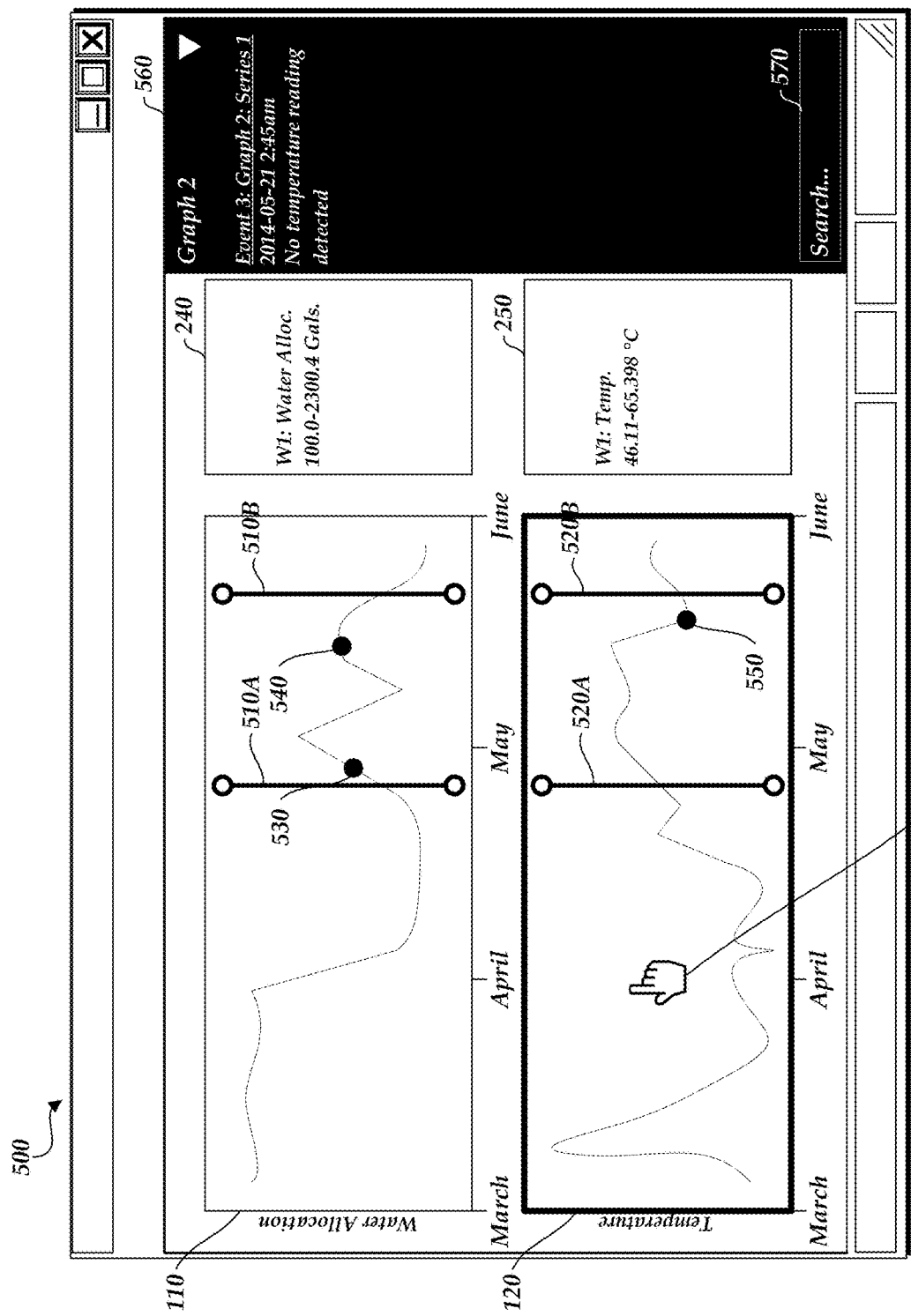

FIGS. 5A-5B illustrate another user interface 500 that displays the time-series graph 110 and the time-series graph 120. As illustrated in FIG. 5A, the time-series graph 110 and the time-series graph 120 include data plotted over the same time period (e.g., March to June). Furthermore, in this example the user may have selected water allocation values in the time-series graph 110 over a particular time period, represented by markers 510A-B, or the user may have selected temperature values in the time-series graph 120 over a time period, represented by markers 520A-B, causing the other time-series graph to display an automatically determined selection of the same time period.

In an embodiment, events (e.g., a manufacturing failure, a contamination event, etc.) may have occurred during the time period associated with the selections in the time-series graph 110 and the time-series graph 120 and/or annotations may be marked. The events that occurred and/or the annotations may be associated with the sensor that measured the water allocation values, the sensor that measured the temperature values, and/or other sensors that measured other data (not shown). Marks 530, 540, and 550 may identify a time at which an event occurred and/or an annotation is marked and/or a time range during which an event occurred and/or an annotation is marked. For example, the mark 530 may indicate that an event occurred or an annotation was marked at a time corresponding to the location of the mark 530 in the time-series graph 110, where the event or annotation is associated with the sensor that measured the water allocation values. Likewise, the mark 540 may indicate that an event occurred or an annotation was marked at a time corresponding to the location of the mark 540 in the time-series graph 110 (e.g., where the event or annotation is associated with the sensor that measured the water allocation values) and the mark 550 may indicate that an event occurred or an annotation was marked at a time corresponding to the location of the mark 550 in the time-series graph 120 (e.g., where the event or annotation is associated with the sensor that measured the temperature values). The marks 530, 540, and/or 550 can be represented in various ways. For example, if the event occurs or the annotation is marked at a specific time instant, the marks 530, 540, and/or 550 can be represented as vertical lines. If the event occurs or an annotation is marked during a range of time, the marks 530, 540, and/or 550 can be represented as blocks (e.g., rectangular blocks) that encompass the time range.

Furthermore, the user interface 500 may include an event information pane or notebook 560. The event information pane 560 may include information on the events that occurred (and/or annotations made by the user) corresponding to the sensors that measured the water allocation data, the temperature data, and/or other data (not shown). The information may include a time-series graph or sensor that the event or annotation is associated with, a time-series within the time-series graph that the event or annotation is associated with, a time that the event occurred (or that the annotation is associated with), and a description of the event or annotation itself, such as a description of the event or annotation provided by a human operator. In an embodiment, the event information pane 560 includes event or annotation information for any event that occurred during a time range for which data was collected and/or for any annotation marked within a time range for which data was collected. In another embodiment, the information displayed in the event information pane 560 is for events that occurred during the entire time range displayed (e.g., March to June) and/or for annotations marked during the entire time range displayed. In another embodiment, the information displayed in the event information pane 560 is for events that occurred during the selected portions (e.g., late April to late May, as represented by the markers 510A-B and 520A-B) and/or for annotations marked within the selected portions. The user interface may include controls that allow the user to select the desired time period for which event information should be included in the event information pane 560.

The event information pane 560 may display event and/or annotation information for every available time-series graph or just selected time-series graphs. For example, the user may use cursor 210 to select the time-series graph 120 (e.g., also referred to as "Graph 2") and not the time-series graph 110 (e.g., also referred to as "Graph 1"), as illustrated by the dark outline of time-series graph 120 in FIG. 5B. Selecting the time-series graph 120 may cause the event information pane 560 to only display the events and/or annotations that are associated with the time-series graph 120 (e.g., the sensor that measured the temperature values) during the currently selected time period associated with markers 520A and 520B. The event information pane 560 may also include a search field 570 that allows the user to search for and identify specific events and/or annotations that may have occurred or been marked within the currently displayed events (or among other events that are not displayed in some embodiments).

Figure 6A:
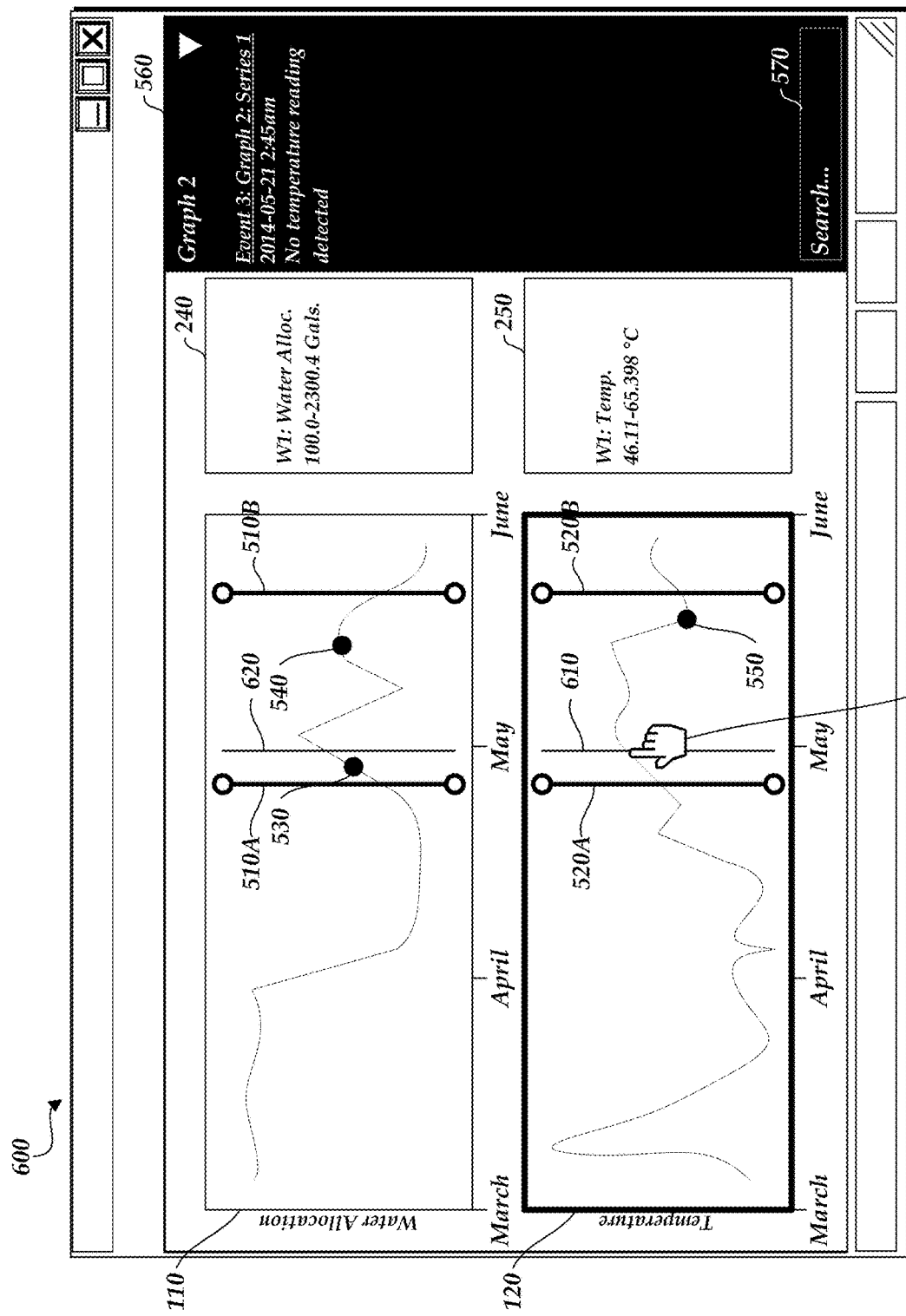
Figure 6B:
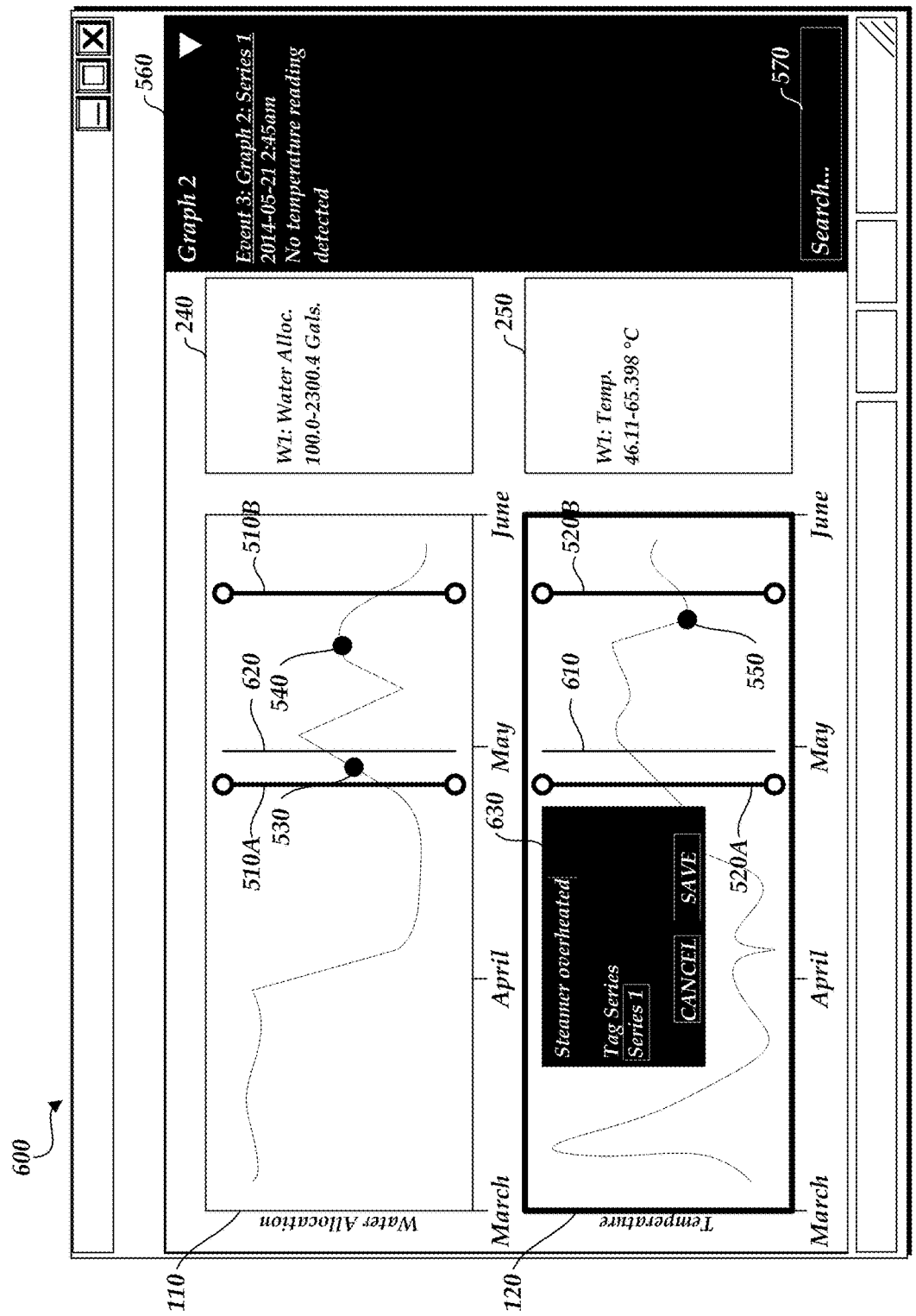

FIGS. 6A-6C illustrate another user interface 600 that displays the time-series graph 110 and the time-series graph 120. As illustrated in FIG. 6A, the time-series graph 120 has been selected by the user (as indicated by the dark outline around time-series graph 120). In this example, the user is hovering the cursor 210 over the time-series graph 120, causing the user interface 600 to display marker 610 at the location of the cursor 210. As described above, a marker 620 corresponding to the marker 610 may be displayed in the time-series graph 110 as a result.

As illustrated in FIG. 6B, the user may provide an instruction to add an event and/or an annotation at a time (or time range) that corresponds to the location of the cursor 210. For example, the user may right-click on a mouse, tap a touch screen, or press a keyboard hotkey to indicate that an event is to be added. Once the user interface 600 receives the instruction, the user interface 600 may display an add event window 630 that appears near a location where the event and/or annotation is to be added. The add event window 630 may be a pop-up window or may be a window that overlays the window displaying the time-series graphs 110 and 120.

In an embodiment, the user can specify a description of the event and/or annotation and a time-series within the time-series graph 120 that the event and/or annotation corresponds to within the add event window 630. As described above, the time-series graph 120 can depict multiple time-series data. However, the time-series graph 120 as illustrated in FIG. 6B only includes a single time-series (e.g., the temperature time-series data, also referred to as "Series 1"). Thus, the add event window 630 only provides an option to associate the event and/or annotation with the time-series depicted in the time-series graph 120. However, if the time-series graph 120 as illustrated in FIG. 6B included two or more time-series, then the add event window 630 would provide the option to specify that the event and/or annotation corresponds to the first time-series (e.g., the temperature time-series), a second time-series, a third time-series, and so on, and/or all time-series graphs or combinations of graphs that are displayed within the time-series graph 120. In many embodiments, each time-series graph is associated with a different sensor or other data source, while in other embodiments a time-series graph may be associated with multiple sensors or other data sources, such as to indicate derived values that are based on two or more sensor values (e.g., a ratio of temperature to pressure). In other embodiments, not shown, the user can specify that an event and/or annotation can be associated with time-series depicted in different time-series graphs (e.g., the time-series graph 110 and the time series-graph 120).

As illustrated in FIG. 6C, the user has specified that the new event and/or annotation is to correspond with the temperature sensor time-series data (illustrated in time-series graph 120). Accordingly, a mark 650 is placed in the time-series graph 120 at the corresponding time. Because the time-series graph 120 is still selected for display of event information, the event information pane 560 is updated to include information about the newly added event and/or annotation (e.g., "Event 2"). Note that former "Event 3" has now become "Event 4" because the events and/or annotations can be listed (and/or numbered) in chronological order and the newly added event or annotation occurs prior to "Event 4" represented by marker 550.

Figure 7A:
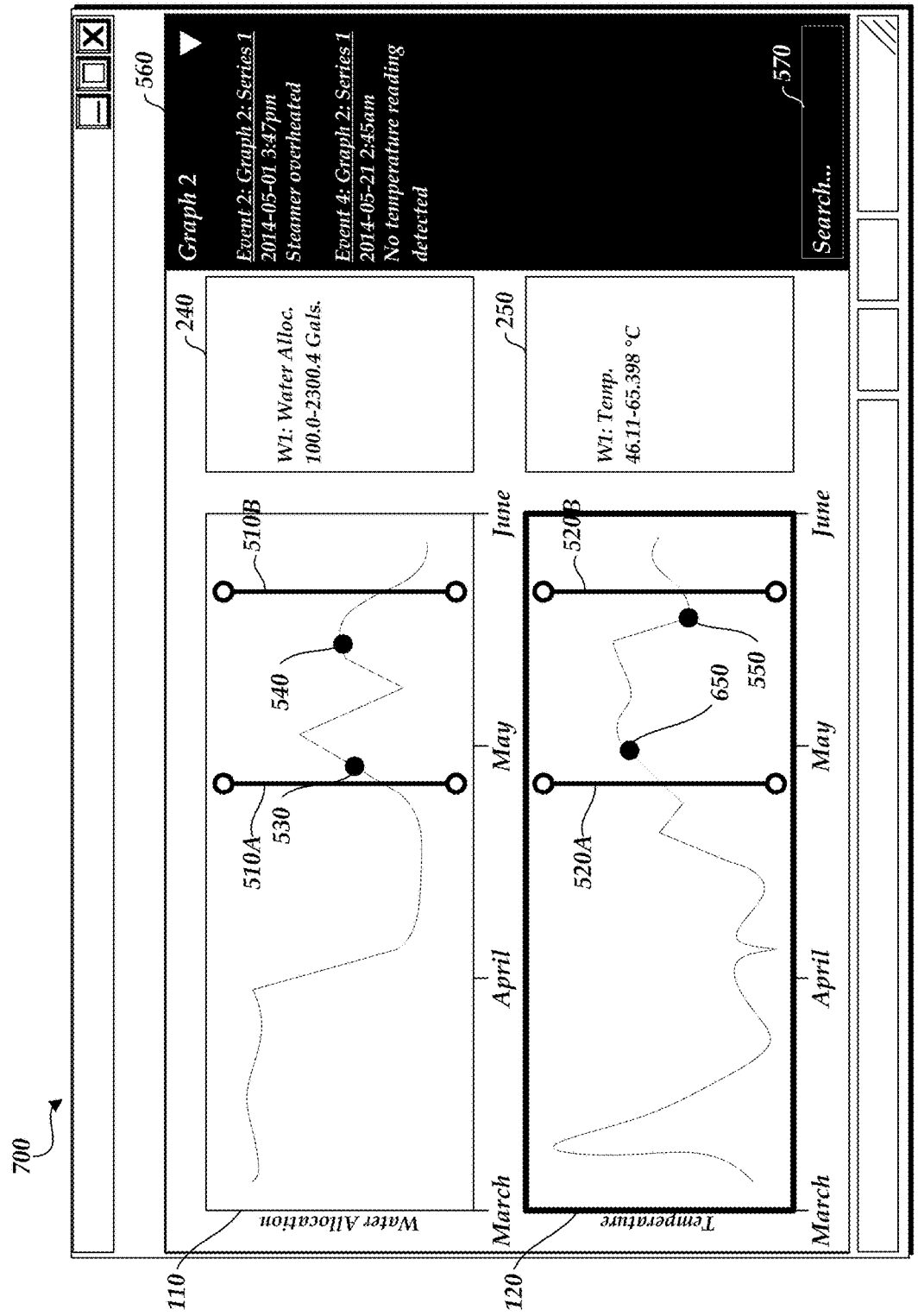
FIGS. 7A-C illustrate another user interface that displays the first time-series graph and the second time-series graph of FIG. 1.
Figure 7B:
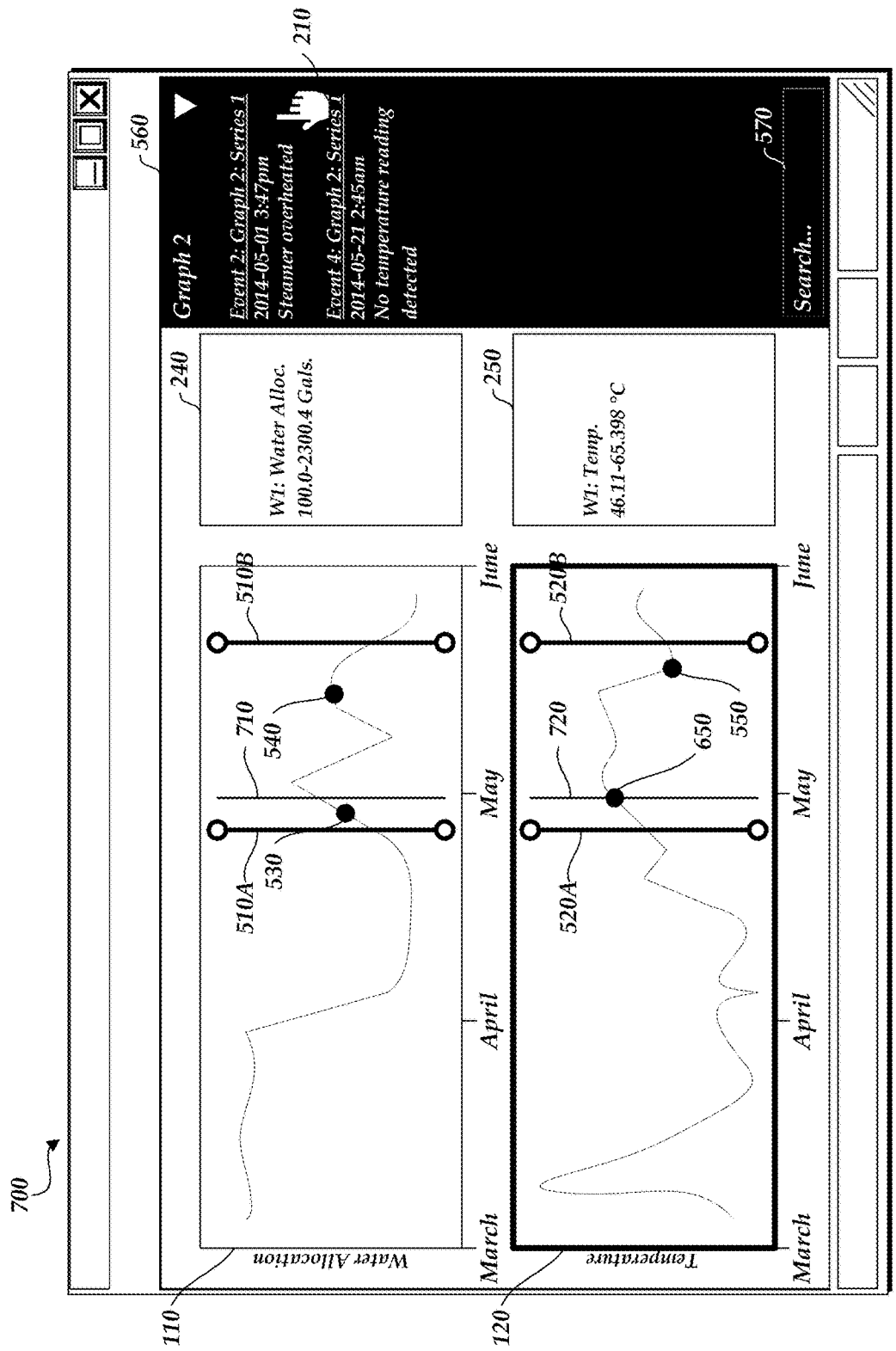
Figure 7C:
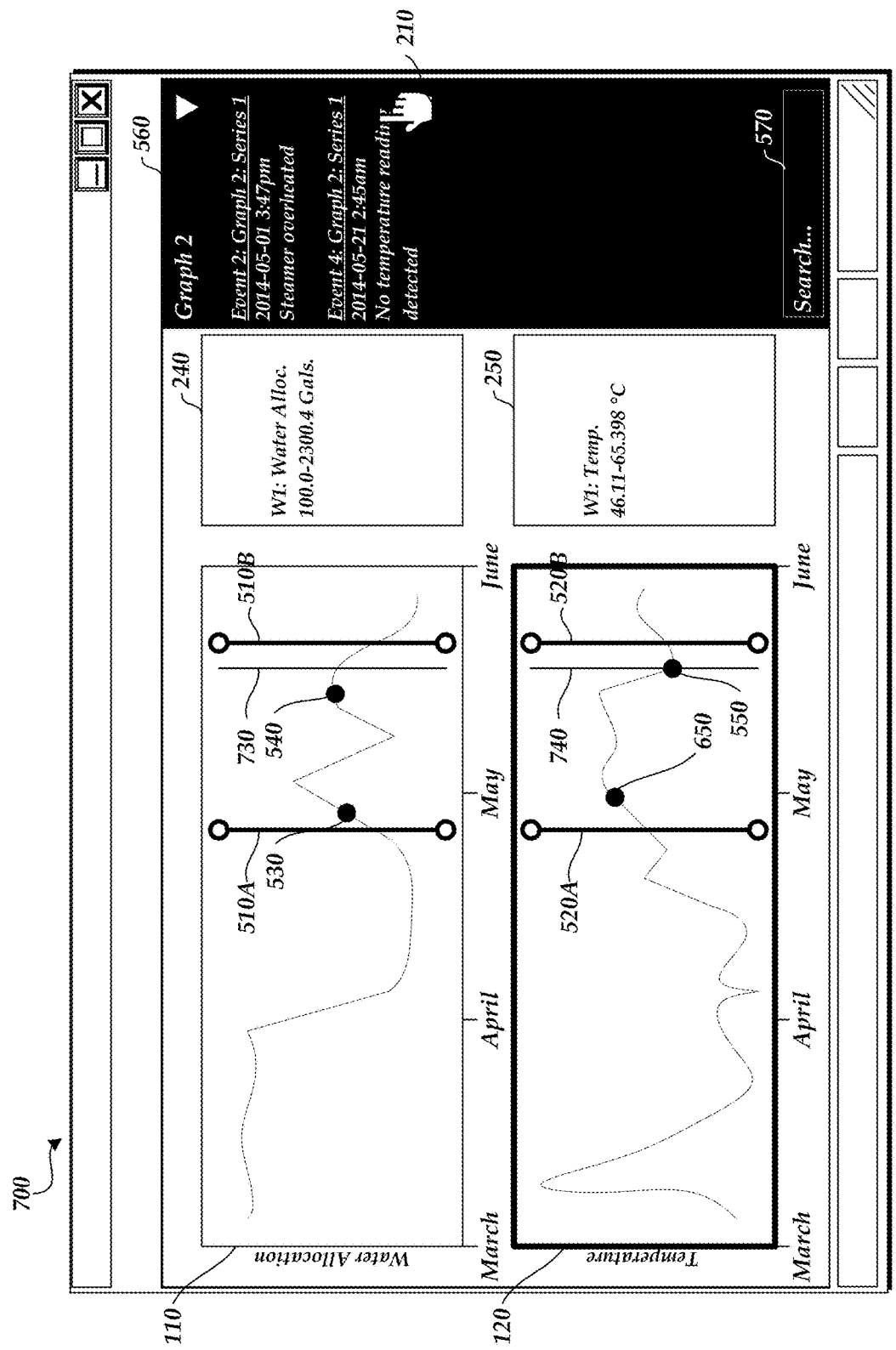

FIGS. 7A-7C illustrate another user interface 700 that displays the time-series graph 110 and the time-series graph 120. As illustrated in FIG. 7A, the time-series graph 120 has been selected by the user. Furthermore, the event information pane 560 includes two events: Event 2 that corresponds with the mark 650 and Event 4 that corresponds with the mark 550.

As illustrated in FIG. 7B, the user may hover over information about an event and/or annotation using the cursor 210. In the example of FIG. 7B, the user has hovered over the Event 2. In an embodiment, when the cursor 210 hovers over and/or is used to select an event and/or annotation, a marker is displayed at a location of the event and/or annotation in the corresponding time-series graph(s). For example, when the cursor 210 hovers over Event 2, a marker 710 is displayed at a location in the time-series graph 110 that corresponds with a time that the event and/or annotation occurred and/or a marker 720 is displayed at a location of the mark 650 in the time-series graph 120. In other embodiments, an event and/or annotation may be selected in any other manner and indications of the corresponding data on the time-series graphs may be indicated in other visual representations, such as an animated circular marker that changes size, blinks off and on, etc.

As illustrated in FIG. 7C, the user has moved the cursor over Event 4. When the cursor 210 hovers over Event 4, a marker 730 is displayed at a location in the time-series graph 110 that corresponds with a time that the event and/or annotation occurred and a marker 740 is displayed at a location of the mark 550 in the time-series graph 120.

Figure 8A:
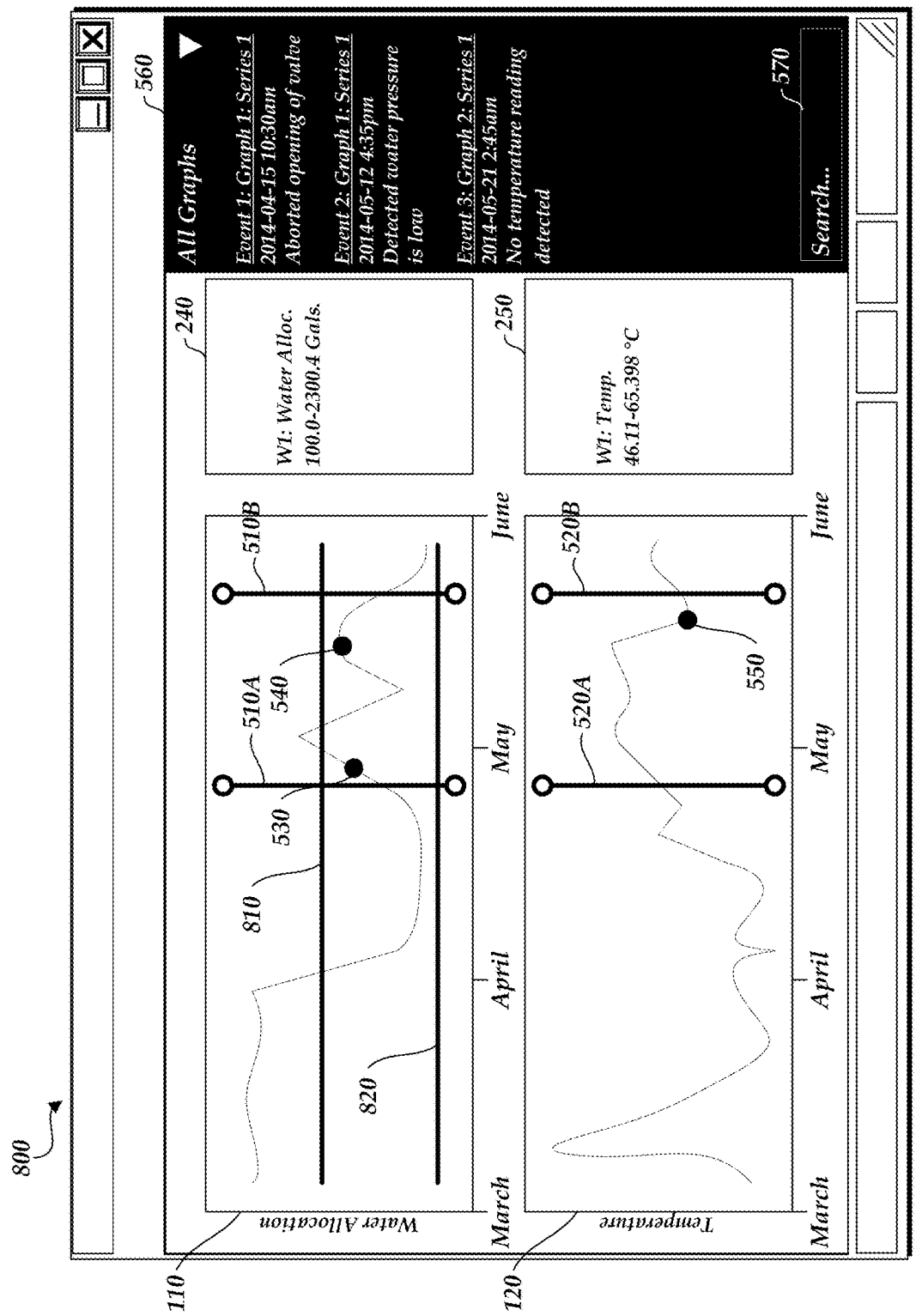
FIGS. 8A-B illustrate another user interface that displays the first time-series graph and the second time-series graph of FIG. 1.
Figure 8B:
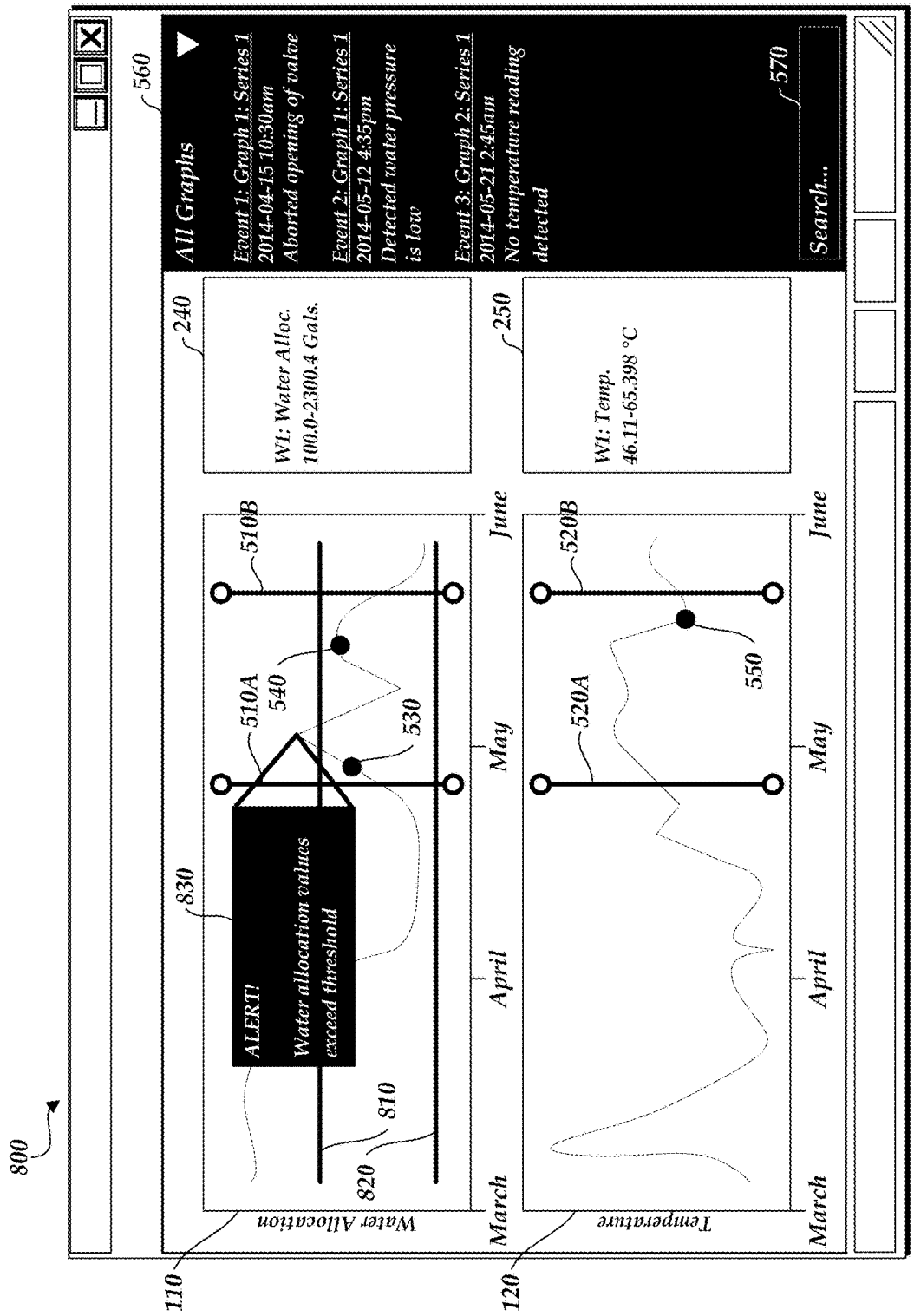

FIGS. 8A-8B illustrate another user interface 800 that displays the time-series graph 110 and the time-series graph 120. In some embodiments, a physical component that is monitored by a sensor may begin to operate outside normal operating conditions. For example, the physical component may have encountered a mechanical issue that causes the physical component to operate at sub-optimal levels. In some cases, the abnormal performance of the physical component could cause a system slowdown or failure. Accordingly, the computing system that generates the user interface 800 may generate an alert to notify a human operator of the abnormal operation.

In an embodiment, the abnormal performance of the physical component is represented by sensor values that are outside of an expected range and an alert may be triggered when the sensor values are outside of the expected range. For example, an alert may be generated for a sensor that measures temperature values for a physical component of an oil well if the measured temperature values exceed certain levels (e.g., 200° F.). Alerts may also be triggered based on a combination of sensor values. For example, an alert may be triggered if values associated with a first sensor (e.g., a temperature sensor) exceed certain values and values associated with a second sensor (e.g., a pressure sensor) do not exceed certain values. Triggering of alerts may initiate real-time (or substantially real-time) notifications to one or more users, such as via text messages, email, phone calls, etc. Thus, the alert may allow the user to make adjustments to the sensor and/or other system components in order to reduce impact of the physical component operating outside of its normal range. Alerts may be recorded and associated with a particular sensor and stored for display along side time-series graphs for the particular sensor in the future, such as in the notes or event information areas of the user interface.

The user interface 800 may display markers that indicate when an alert would be or should be triggered. For example, marker 810 may indicate an upper boundary at which point an alert may be triggered and marker 820 may indicate a lower boundary at which point an alert may be triggered. As illustrated in FIG. 8A, an alert was triggered in May as the water allocation values exceeded the value associated with the marker 810.

FIG. 8B illustrates an example recorded alert 830 that was triggered when the water allocation values exceeded the value associated with the marker 810. The user interface 800 may display the alert 830 if a user hovers over the portion of the time-series graph 110 that includes values that exceed the value associated with the marker 810 or that do not exceed the value associated with the marker 820.

Figure 9A:
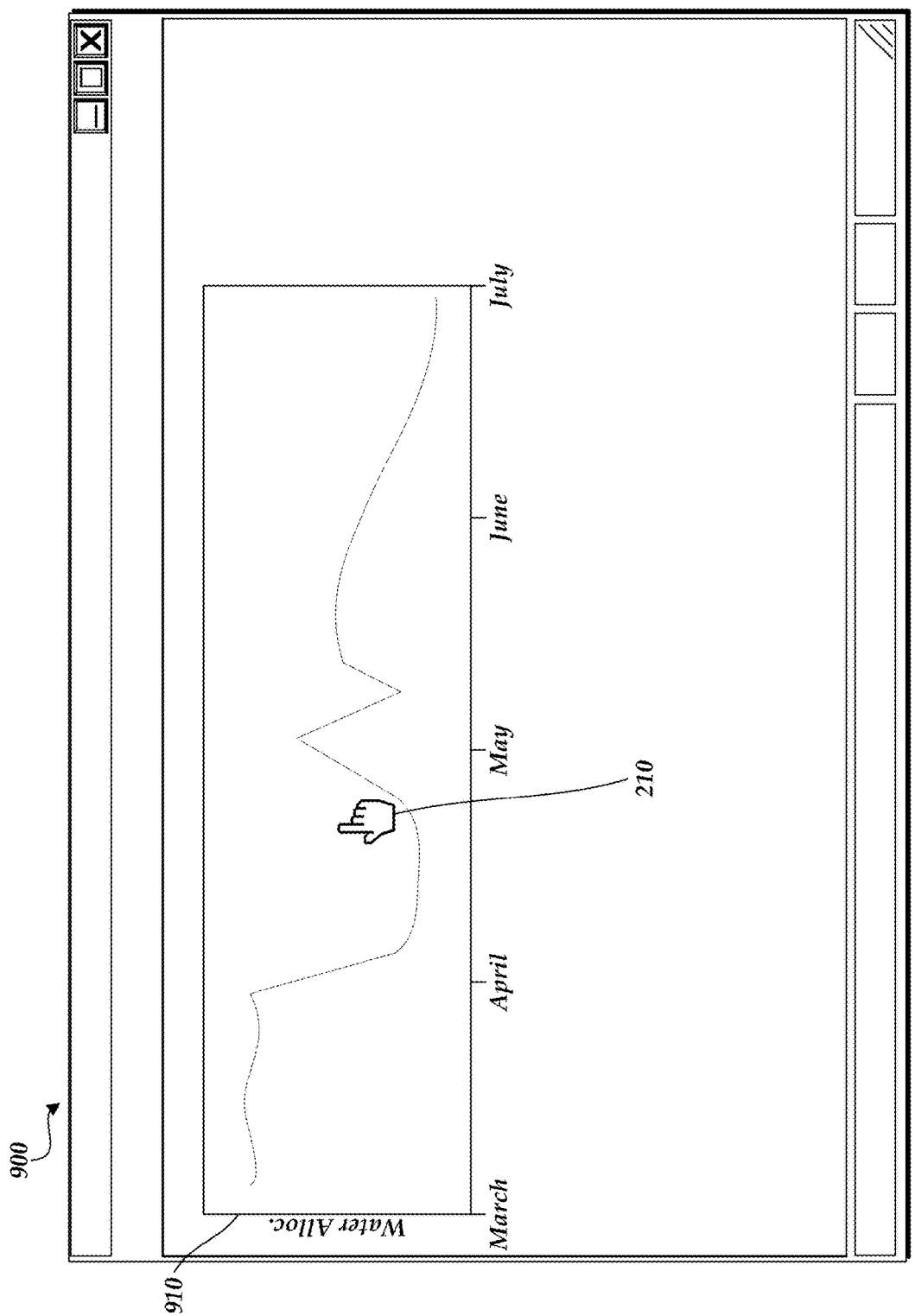
FIGS. 9A-E illustrate another user interface that displays the first time-series graph and the second time-series graph of FIG. 1.

FIGS. 9A-9E illustrate a user interface 900 that correlates time-series and scatterplot graphs. As illustrated in FIG. 9A, the user interface 900 includes a time-series graph 910. The user may use the cursor 210 to begin selecting a portion of the time-series graph 910.

Figure 9B:
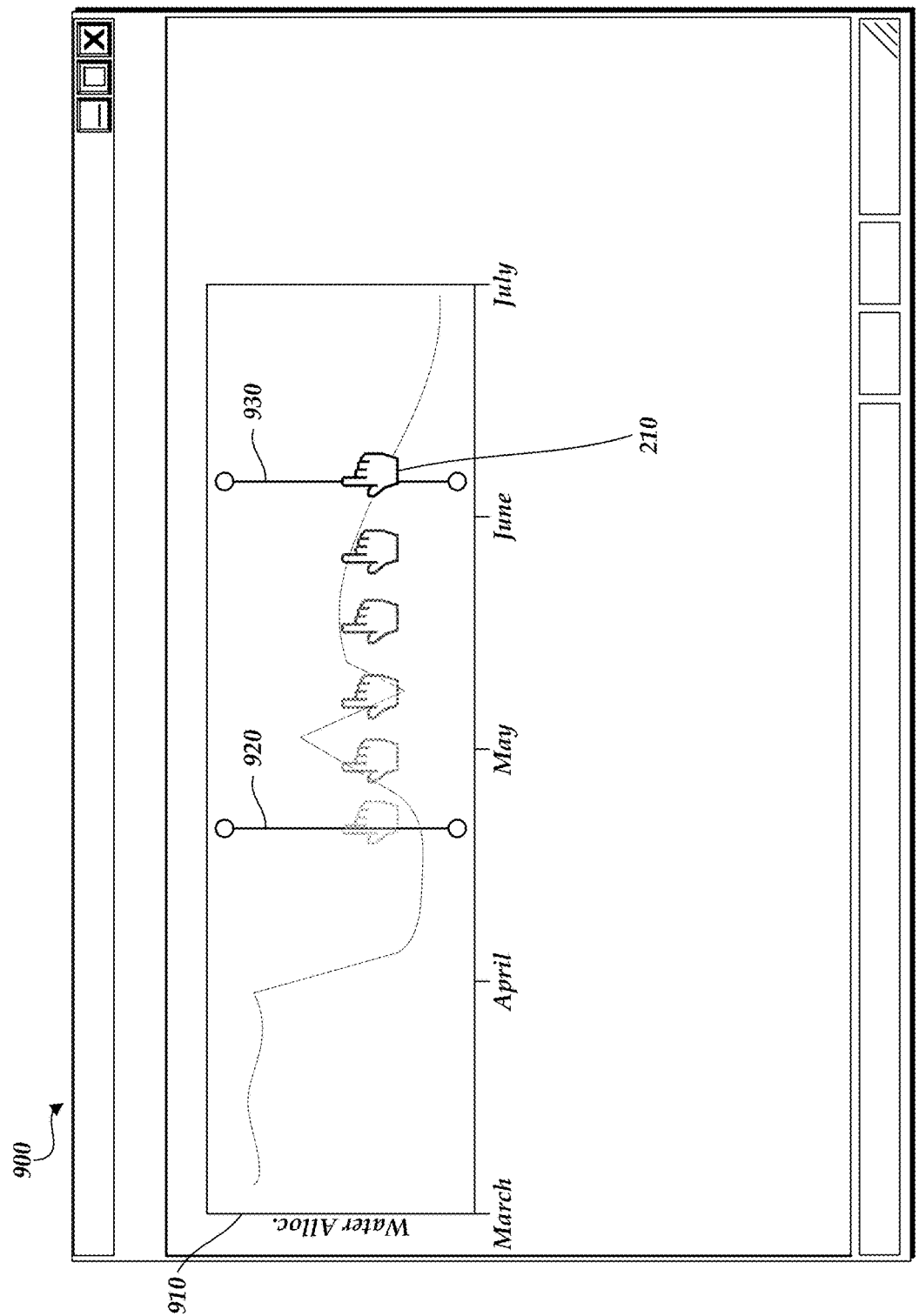

As illustrated in FIG. 9B, the user, via the cursor 210, has selected a portion of the time-series graph 910 represented by markers 920 and 930. The selected portion of the time-series graph 910 represents water allocation values for a time period between late April and early June.

Figure 9C:
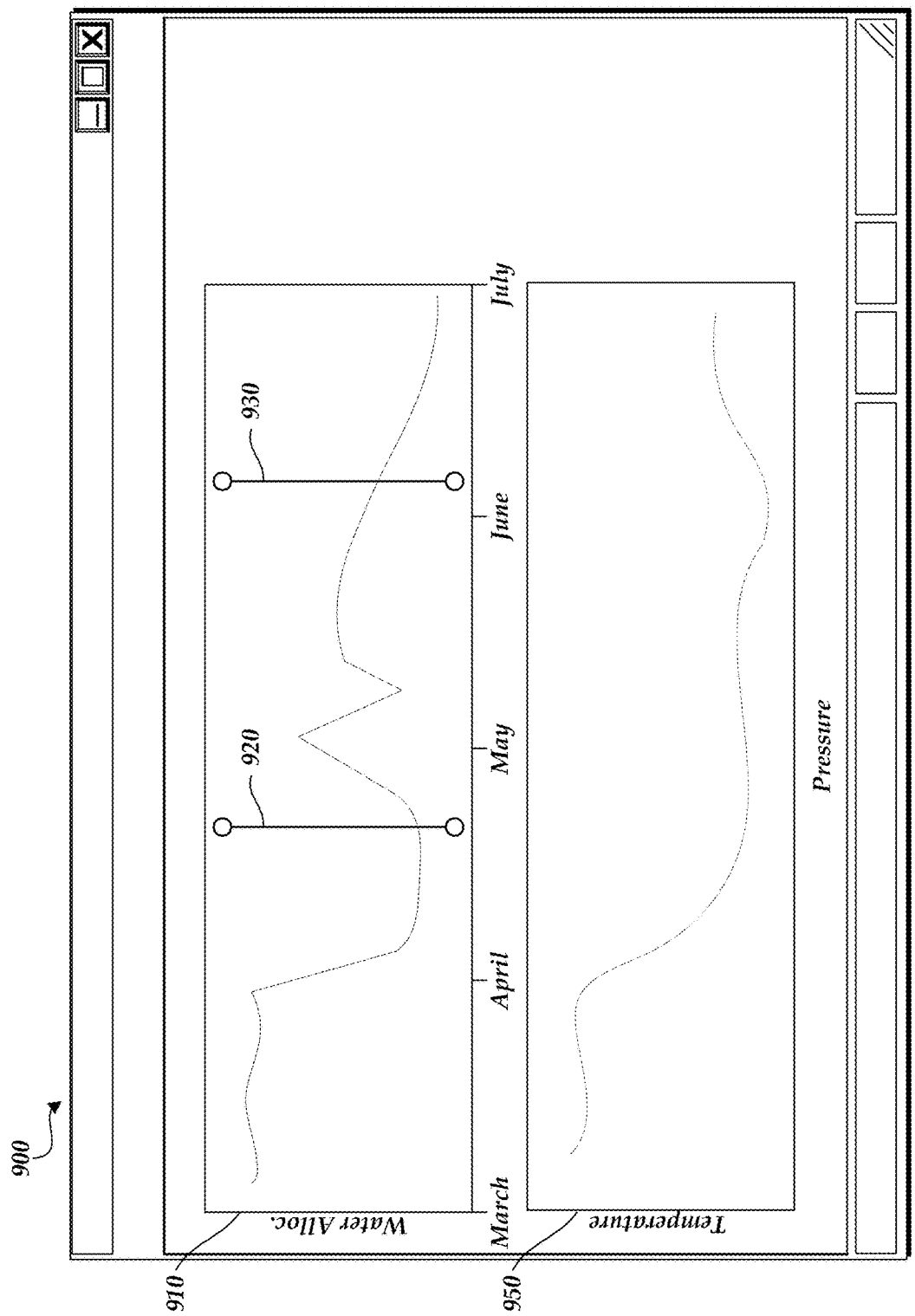

As illustrated in FIG. 9C, based on the selection in the time-series graph 910, a scatterplot 950 is displayed in the user interface 900. The scatterplot 950 may include temperature values plotted against pressure values. Each combination of temperature and pressure values may have been measured at a time within the time period corresponding to the selected portion of the time-series graph 910 (e.g., late April and early June). Thus, for every time increment in the time period, the computing system may retrieve a temperature value and a pressure value and generate the user interface 900 such that it plots the temperature value as a function of the pressure value.

In an embodiment, the water allocation values may be measured by a sensor associated with a system. The temperature values and the pressure values may also be measured by sensors associated with the same system.

Figure 9D:
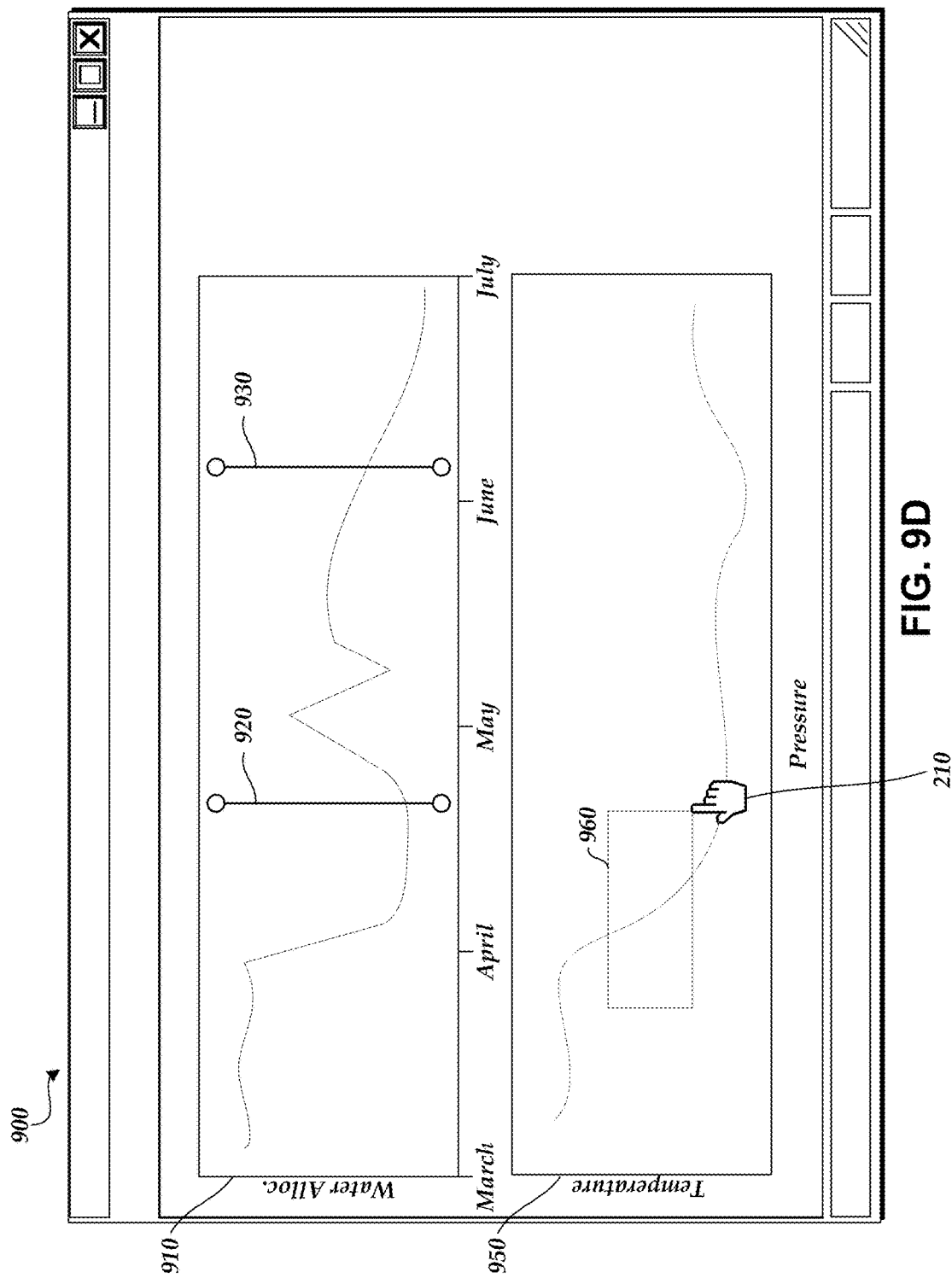

As illustrated in FIG. 9D, the user can make a selection in the scatterplot 950 using the cursor 210. For example, the user can make a selection represented by box 960, where the box 960 includes various combinations of temperature and pressure values.

Figure 9E:
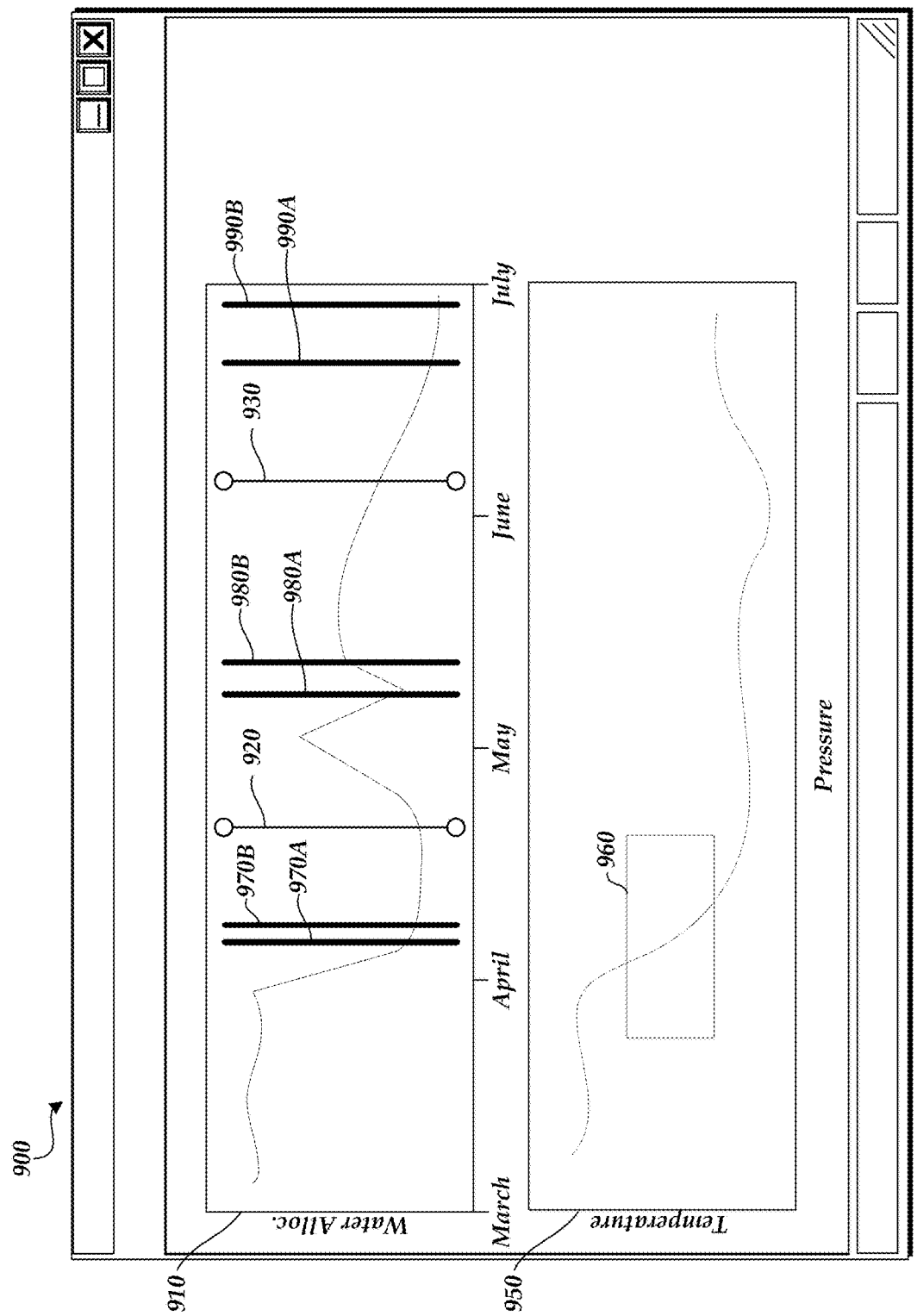

Once the user makes the selection in the scatterplot 950, the computing device may determine all times that the individual combinations of temperature and pressure values within the box 960 occurred. For example, while the combination of temperature and pressure values in the box 960 occurred during the time period between markers 920 and 930, the same combination of temperature and pressure values may have occurred at other times. Thus, the user interface 900 may indicate such times. As illustrated in FIG. 9E, markers 970A and 970B designate a first time period during which some or all combinations of temperature and pressure values in the box 960 occurred, markers 980A and 980B designate a second time period during which some or all combinations of temperature and pressure values in the box 960 occurred, and markers 990A and 990B designate a third time period during which some or all combinations of temperature and pressure values in the box 960 occurred. Alternatively or in addition, the portions of the time-series graph 910 that correspond with the times that the individual combinations of temperature and pressure values within the box 960 occurred can be bolded, highlighted, and/or otherwise annotated to indicate such times.

Example Use Case of an Interactive User Interface with Time-Series Graphs

Figure 10B:
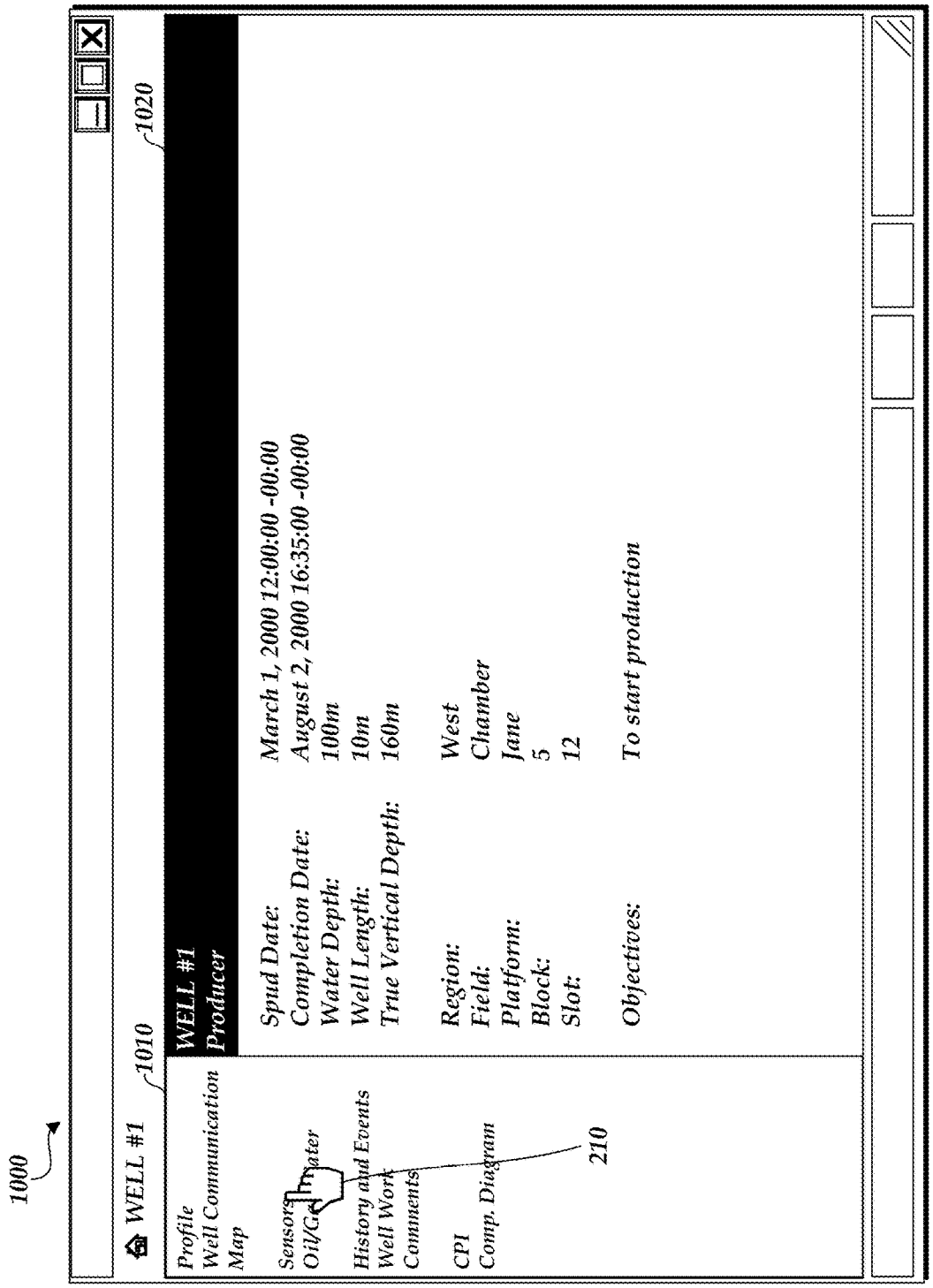

FIGS. 10A-10D illustrate a user interface 1000 that provides interactive information about an oil well. As illustrated in FIG. 10A, the user interface 1000 includes a first window 1010 and a second window 1020. The window 1010 may be a navigation window that includes a list of selectable buttons that can be used to provide further information about the oil well. The window 1020 may be an informational window that provides details about the oil well, such as the well's age, the well's location, and/or the well's objectives.

As illustrated in FIG. 10B, the user may select a sensors button in the window 1010 using the cursor 210. The sensors button may retrieve data measured by the various sensors of the oil well. For example, the data may be retrieved from databases associated with the system that the sensors are associated with, and the data may be displayed in time-series graphs, scatterplot graphs, and/or the like as described herein.

Figure 10C:
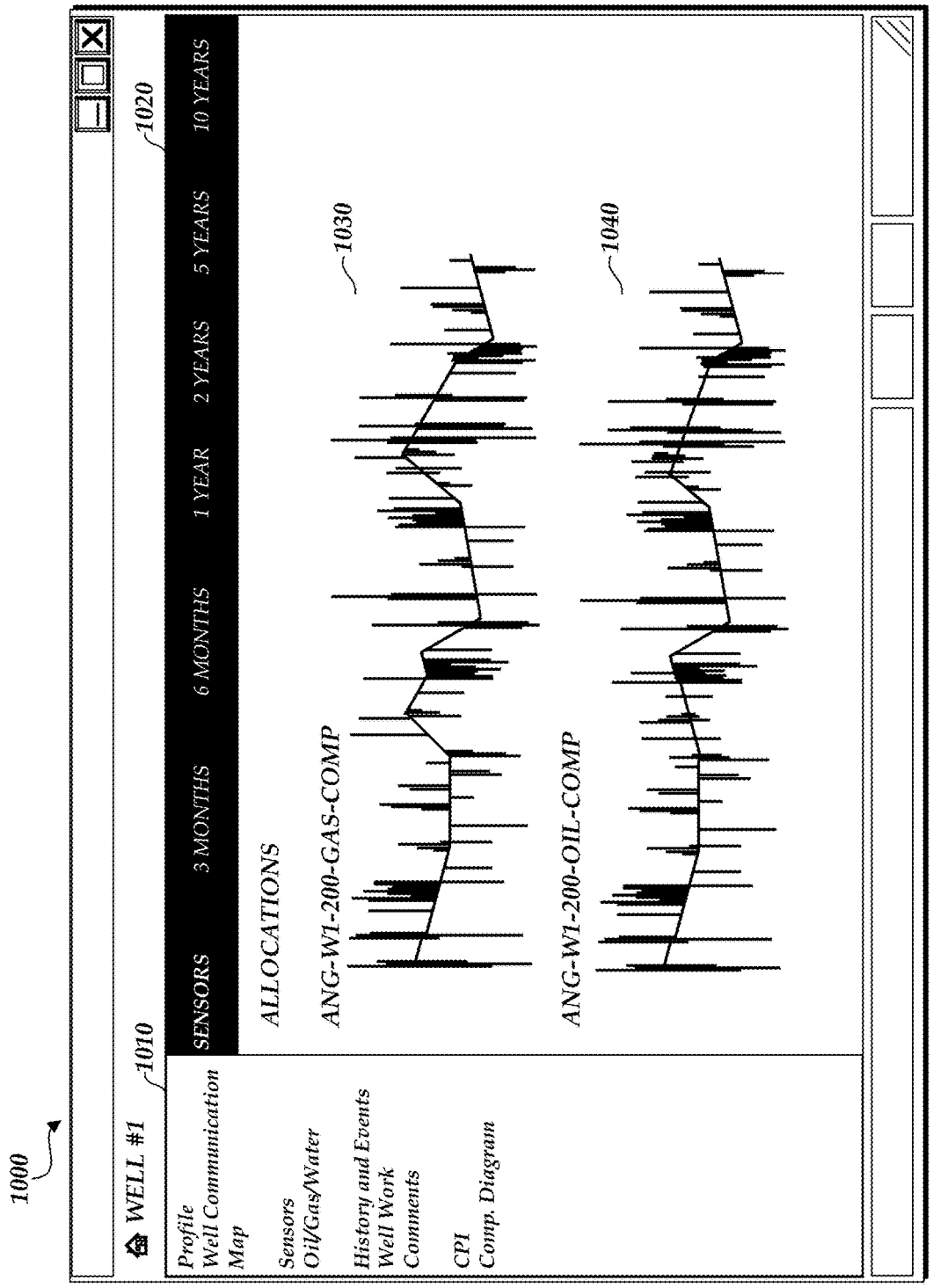

As illustrated in FIG. 10C, after the sensors button is selected, the window 1020 may display various time-series graphs 1030 and 1040. The time-series graphs 1030 and/or 1040 may be manipulated in any manner as described herein with respect to FIGS. 1 through 9E. In addition, the user interface 1000 may display any number of time-series graphs, each of which may be manipulated in the manners described herein. For example, several time-series graphs (e.g., three, four, five, or more graphs) may be concurrently displayed on one or more display devices, each with differing (or identical) timescales for the corresponding sensor data displayed. According to the systems and methods discussed above, a user may select a particular time or time period on one of the displayed time-series graphs and, in response to such selection, the system automatically selects corresponding time periods in each of the other time-series graphs.

Figure 10D:
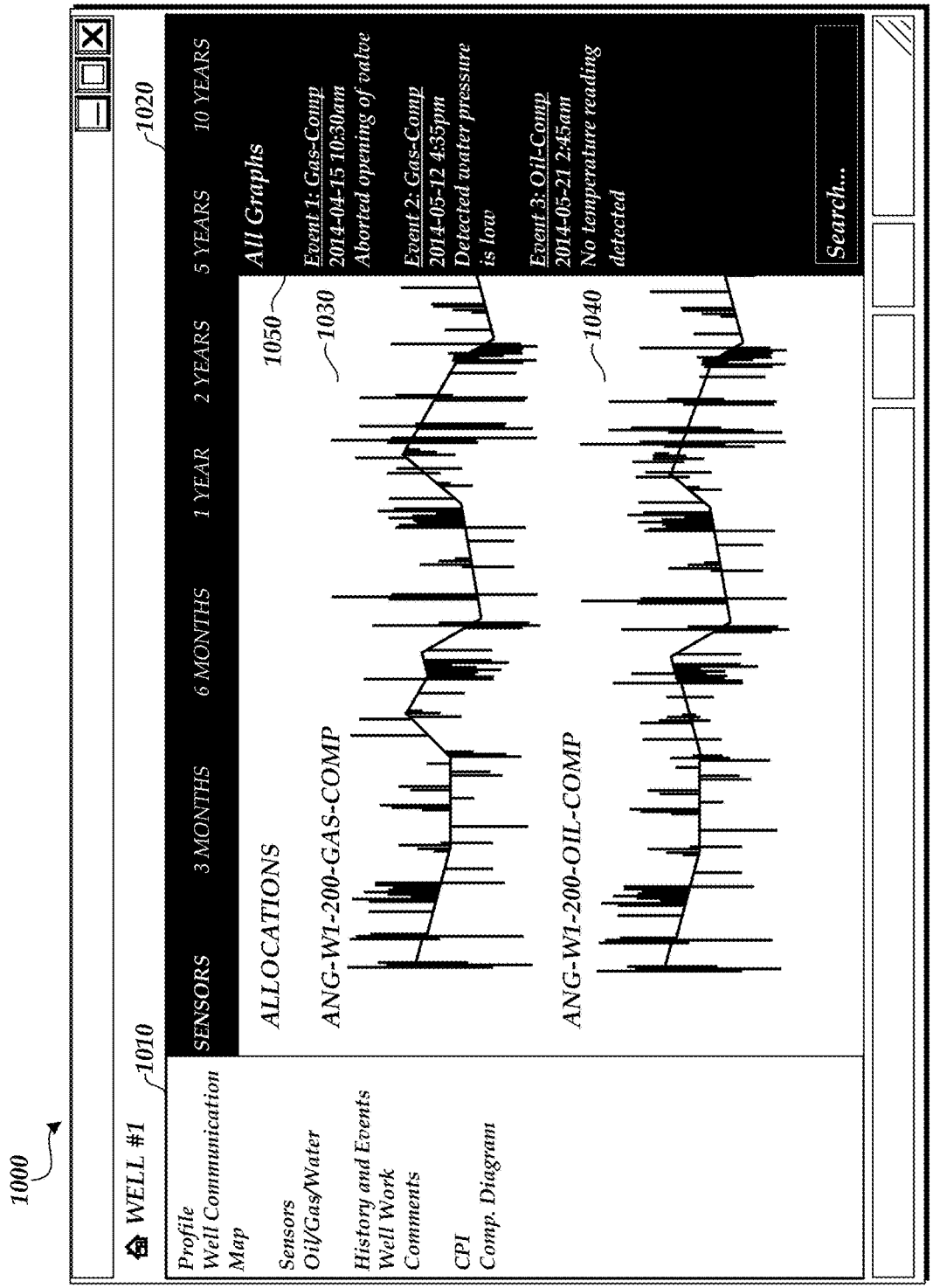

As illustrated in FIG. 10D, the user interface 1000 may also include an event information pane 1050 that provides event information for events that occurred and/or annotations that are related to the sensors that measured the data depicted in the time-series graphs 1030 and/or 1040.

Figure 11A:
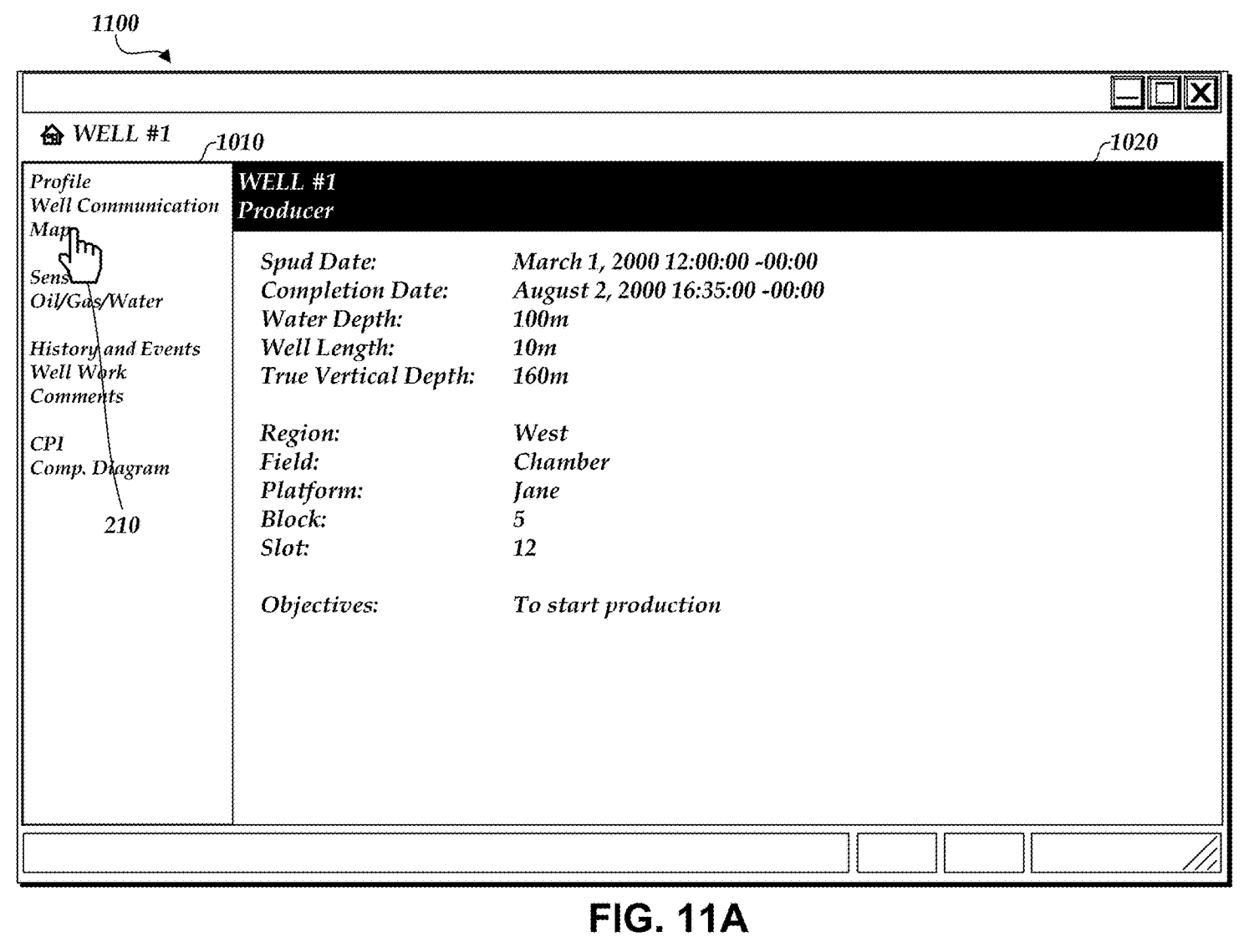
Figure 11B:
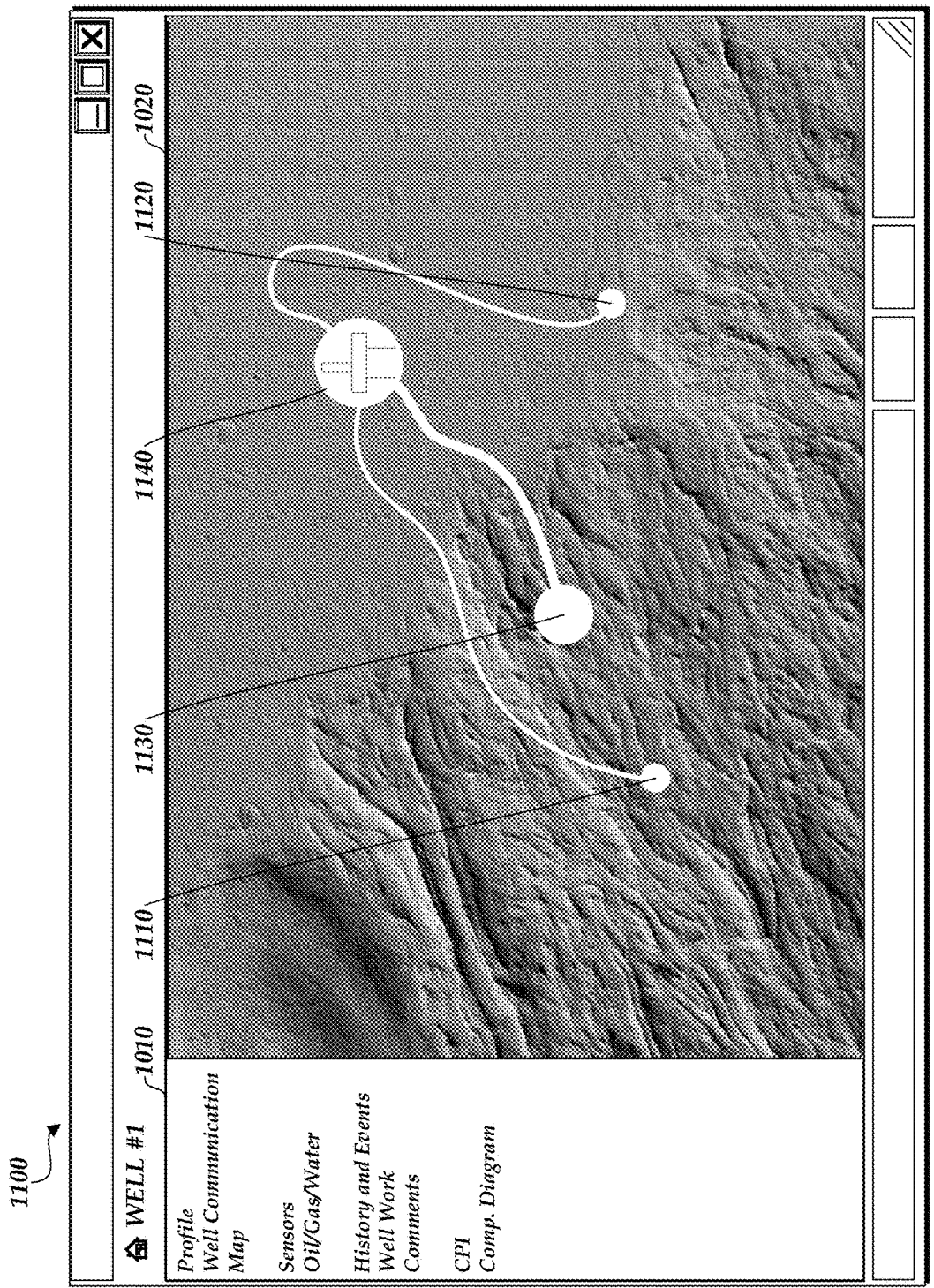

FIGS. 11A-11D illustrate another user interface 1100 that provides interactive information about an oil well. As illustrated in FIG. 11A, the user interface 1100 includes the windows 1010 and 1020. In an embodiment, the user selects a maps button in the window 1010.

As illustrated in FIG. 11B, once the maps button is selected, the window 1020 displays a map showing a location of an oil well 1140, injectors 1110 and 1120, producer 1130, and/or other related components (not shown).

Figure 11C:
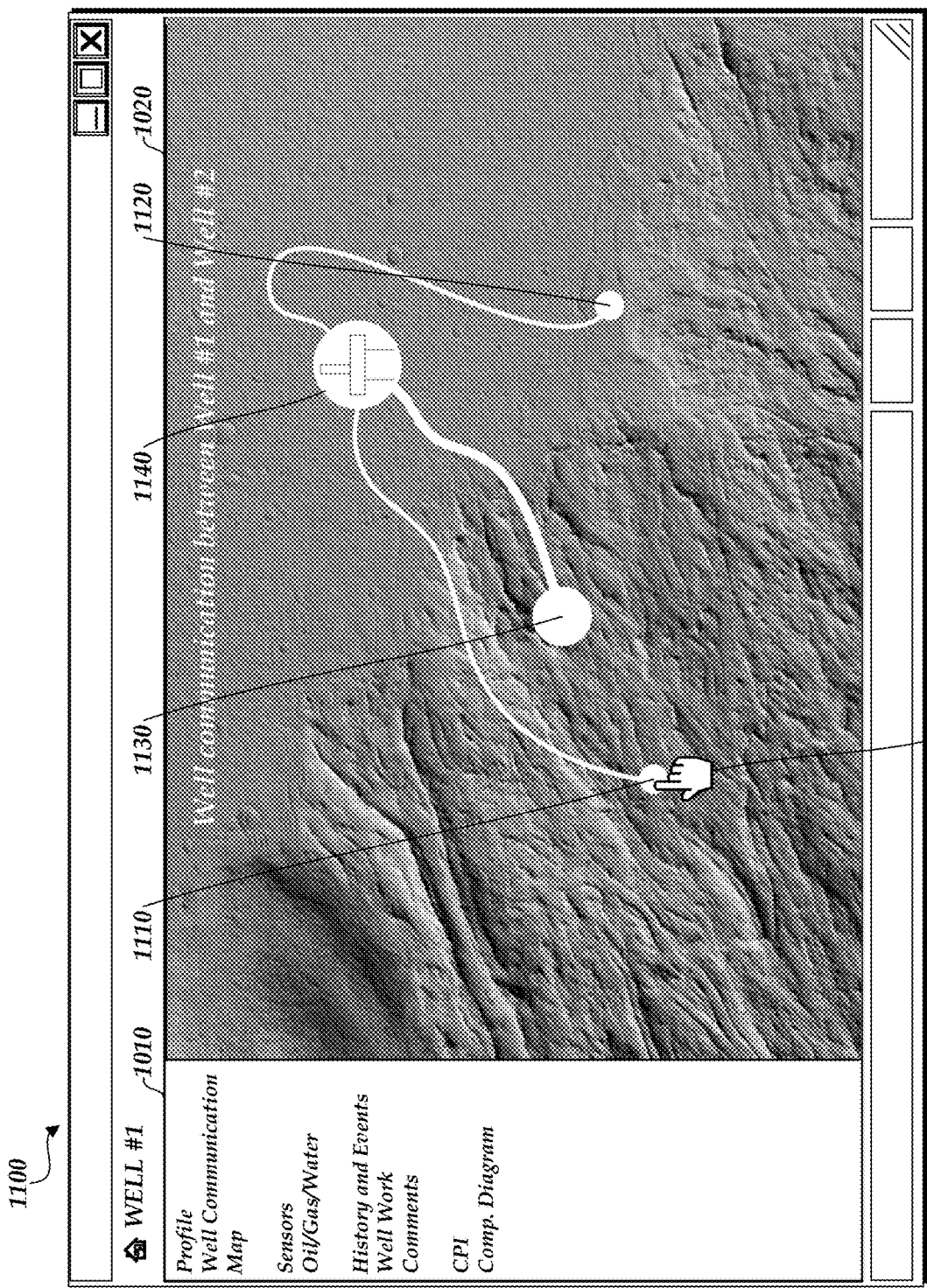

As illustrated in FIG. 11C, the user may hover and/or select one or more of the components depicted in the map to view more information. For example, the cursor 210 may hover over the injector 1110, which causes the user interface 1100 to display text associated with the injector 1110 in the window 1020 (e.g., "well communication between A01 and A1").

As illustrated in FIG. 11D, selecting a component may allow the user to view additional information about the component in the window 1020. For example, selection of the injector 1110 causes the user interface 1100 to provide more information about the injector 1110 (e.g., the injector's age, the injector's location, the injector's objectives, etc.).

Furthermore, from the information displayed in FIG. 11D the user may select the sensors indicator in order to view one or more time-series graphs associated with sensor data of the selected component (a particular well in the example of FIG. 11D).

Figure 12:
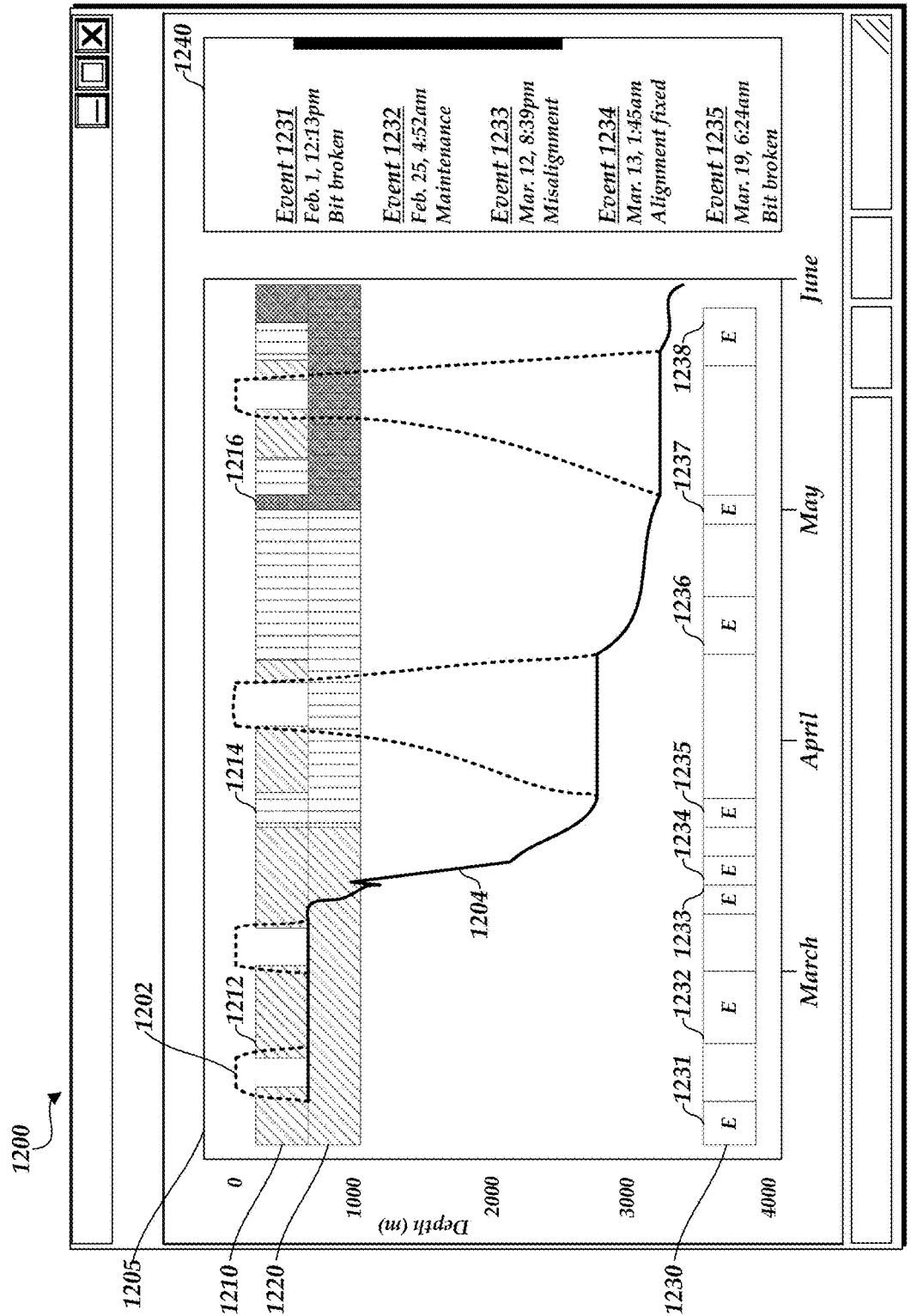
FIG. 12 illustrates another user interface that displays drill bit, hole depth, and rock layer information.

FIG. 12 illustrates another user interface 1200 that displays drill bit, hole depth, and rock layer information. As illustrated in FIG. 12, the user interface 1200 includes graph 1205 and window 1240. The graph 1205 may display a vertical position of an item (e.g., a drill bit) in an underground crevice or structure (e.g., an oil well) over a period of time in which a rock layer at the position of the item, a rock layer at the bottom of the underground crevice or structure (e.g., a hole depth), and/or events associated with the underground crevice or structure that have occurred during the period of time are indicated. For example, the graph 1205 may have an x-axis that represents time (e.g., in months), may have a y-axis that represents depth below the surface (e.g., in meters), and may display a vertical position of a drill bit in an oil well over a period of time. The graph 1205 may also display a rock layer at the position of the drill bit during the period of time, a rock layer at the bottom of the oil well during the period of time, and events associated with the oil well that occurred during the period of time.

As illustrated in FIG. 12, the graph 1205 includes a curve 1202 that represents a depth of the drill bit at each point in time. The graph 1205 further includes a curve 1204 that represents a depth of the bottom of the oil well at each point in time. For example, the drill bit may be used alone or as a part of a larger apparatus to drill into the ground to increase the depth of the oil well. Occasionally, the drill bit may be raised from the bottom of the oil well to the surface (e.g., to perform maintenance on the drill). Thus, the curve 1202 may rise and fall as drilling begins, ends, and restarts. However, the depth of the bottom of the oil well may not decrease (e.g., the depth may not decrease from 1000 m below the surface to 500 m below the surface) unless, for example, the hole in the oil well is filled in. Thus, the curve 1204 may remain static over time or continue to fall down along the y-axis.

Row 1210 identifies the different rock layers at a vertical position of the drill bit over time. For example, between February and mid-March, the drill bit may be at a depth that falls within rock layer 1212 (except for times in which the drill bit is at the surface, which is indicated by a blank space in the row 1210). After mid-March, the drill bit may briefly be at a depth that falls within rock layer 1214. However, prior to the beginning of April, the drill bit may be slowly raised to the surface. During this time, the drill bit may pass from the rock layer 1214 to the rock layer 1212 before reaching the surface, as indicated in the row 1210. Likewise, in May, the drill bit may reach a depth below the surface that falls within rock layer 1216, as indicated in the row 1210.

Row 1220 identifies the different rock layers at the bottom of the oil well over time. For example, the row 1220 may identify the deepest rock layer reached by the drill bit (assuming that the oil well is not filled in and that the deepest region reached by the drill bit corresponds with the depth of the bottom of the oil well). Thus, while the drill bit may be raised to the surface in mid-May, the row 1220 indicates that the rock layer 1216 is the rock layer at the depth of the bottom of the oil well.

Row 1230 identifies a time or time range at which various events 1231-1238 may have occurred in the period of time viewed within the graph 1205. Information on one or more of the events 1231-1238 may be provided in the window 1240. For example, the window 1240 may identify an event, a time that the event occurred, and/or a description of the event. Accordingly, a user may be able to identify times in which an oil well is not being drilled, reasons why such delays have occurred, and/or possible solutions for reducing such delays.

In further embodiments, not shown, additional data or curves can be included in the graph 1205. For example, a curve indicating levels of gamma radiation at the vertical position of the drill bit (e.g., a curve in which the y-axis value represents gamma radiation levels at the vertical position of the drill bit at a time instant and the x-axis value represents time), a curve indicating levels of gamma radiation at the bottom of the oil well (e.g., a curve in which the y-axis value represents gamma radiation levels at the bottom of the oil well at a time instant and the x-axis value represents time), a curve indicating levels of gamma radiation at a static or dynamic depth within the oil well (e.g., a curve in which the y-axis value represents gamma radiation levels at the static or dynamic depth and the x-axis value represents time), and/or the like may be included in the graph 1205.

Example Process Flow

Figure 13:
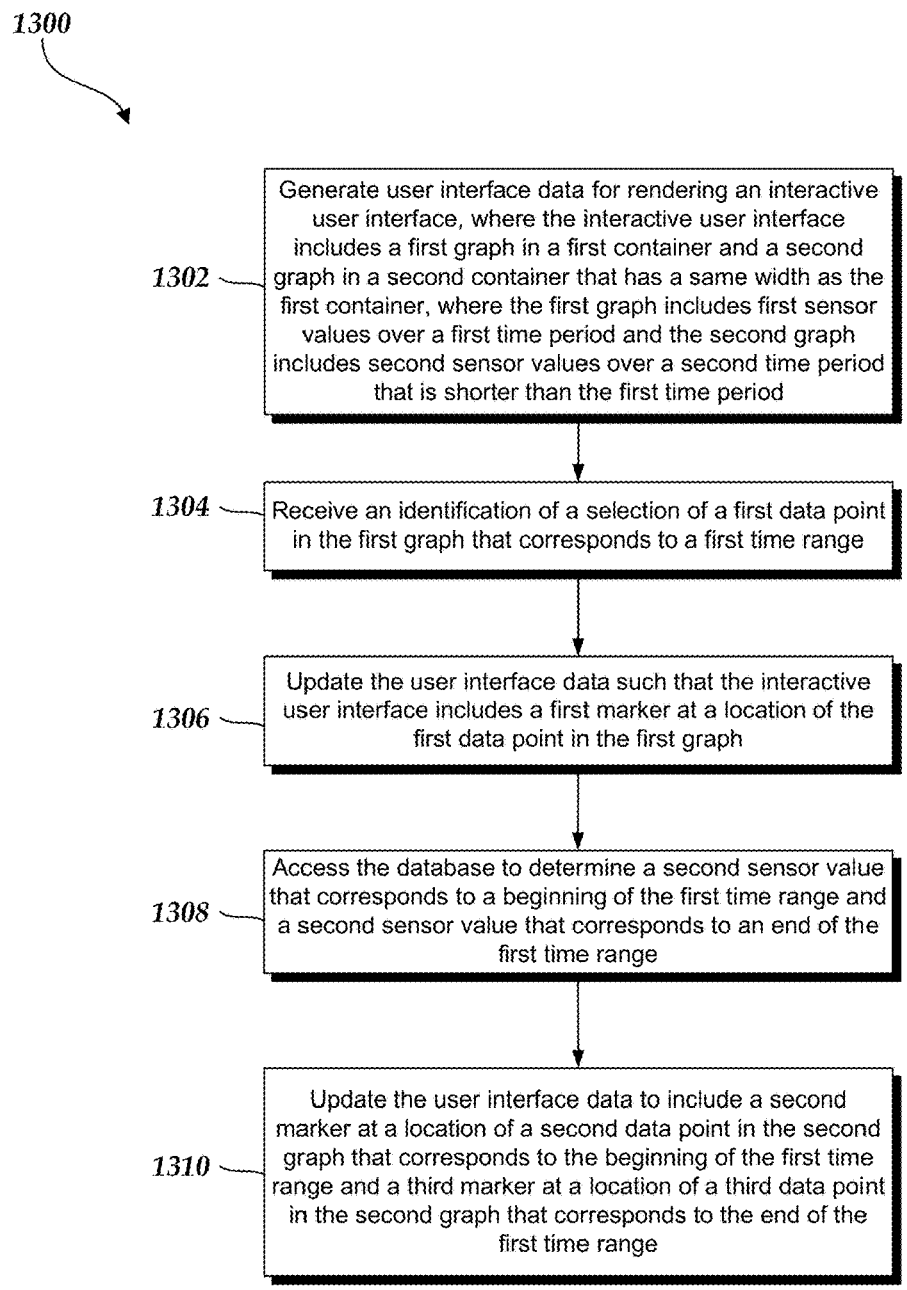
FIG. 13 is a flowchart depicting an illustrative operation of accessing one or more databases in substantially real-time in response to input from a user provided in an interactive user interface in order to determine information related to measured data points and provide the determined information to the user in the interactive user interface.

FIG. 13 is a flowchart 1300 depicting an illustrative operation of accessing one or more databases in substantially real-time in response to input from a user provided in an interactive user interface in order to determine information related to measured data points and provide the determined information to the user in the interactive user interface. Depending on the embodiment, the method of FIG. 13 may be performed by various computing devices, such as by the computing system 1400 described below. Depending on the embodiment, the method of FIG. 13 may include fewer and/or additional blocks and the blocks may be performed in an order different than illustrated. While the flowchart 1300 is described with respect to having sensor data depicting in graphs, this is not meant to be limiting. The illustrative operation depicting in the flowchart 1300 can be implemented on any type of time-series data from any source.

In block 1302, user interface data for rendering an interactive user interface is generated. The interactive user interface may include a first graph in a first container and a second graph in a second container that has a same width as the first container. The first graph may include first sensor values over a first time period and the second graph may include second sensor values over a second time period.

In block 1304, an identification of a selection of a first data point in the first graph that corresponds to a first time range is received. The first time range could be determined based on a time range that corresponds with each individual pixel in an x-axis.

In block 1306, the user interface data is updated such that the interactive user interface includes a first marker at a location of the first data point in the first graph. The marker may be a vertical line that is temporarily displayed in the interactive user interface.

In block 1308, the database is accessed to determine a second sensor value that corresponds to a beginning of the first time range and a second sensor value that corresponds to an end of the first time range. For example, the second sensor value that corresponds to a beginning of the first time range may be a sensor value that was measured at a time that corresponds with the beginning of the first time range.

In block 1310, the user interface data is updated to include a second marker at a location of a second data point in the second graph that corresponds to the beginning of the first time range and a third marker at a location of a third data point in the second graph that corresponds to the end of the first time range. Thus, the user may be able to view, within the interactive user interface, first sensor values and second sensor values that were measured at the same time.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 14:
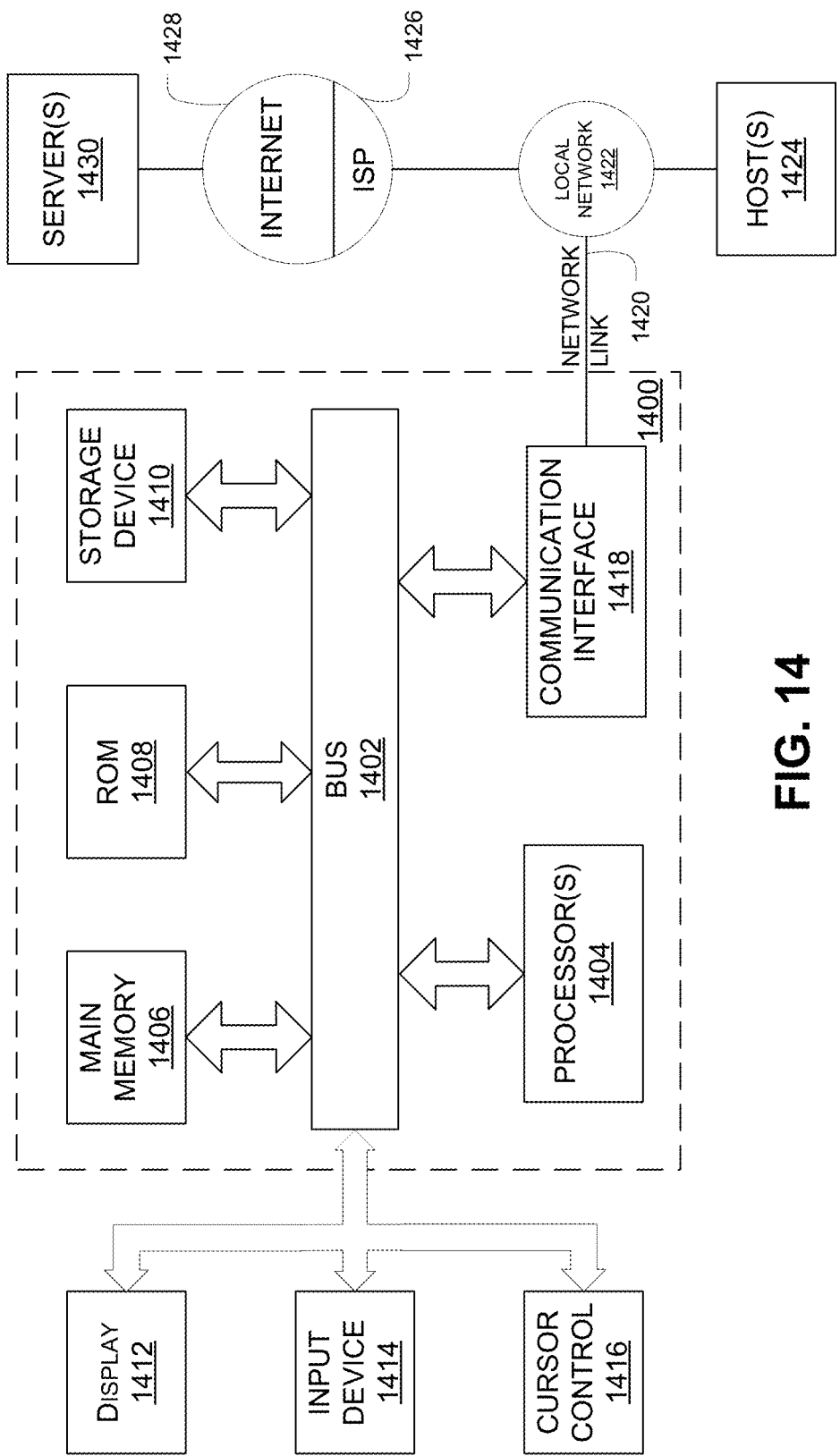
FIG. 14 illustrates a computer system with which certain methods discussed herein may be implemented, according to one embodiment.

For example, FIG. 14 is a block diagram that illustrates a computer system 1400 upon which an embodiment may be implemented. For example, any of the computing devices discussed herein may include some or all of the components and/or functionality of the computer system 1400.

Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions. Main memory 1406 may also store cached data, such as zoom levels and maximum and minimum sensor values at each zoom level.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions. For example, the storage device 1410 may store measurement data obtained from a plurality of sensors.

Computer system 1400 may be coupled via bus 1402 to a display 1412, such as a cathode ray tube (CRT) or LCD display (or touch screen), for displaying information to a computer user. For example, the display 1412 can be used to display any of the user interfaces described herein with respect to FIGS. 1 through 12. An input device 1414, including alphanumeric and other keys, is coupled to bus 1402 for communicating information and command selections to processor 1404. Another type of user input device is cursor control 416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement and/or update (e.g., in response to the graph manipulations described herein) a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 406, from which processor 1404 retrieves and executes the instructions. The instructions received by main memory 1406 may retrieve and execute the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
a computer processor; and
a computer readable storage medium storing program instructions configured for execution by the computer processor in order to cause a user interface module of the computing system to:
generate user interface data for rendering an interactive user interface on a computing device, the interactive user interface including a first graph and a second graph, wherein the first graph includes first data values over a first time period and the second graph includes second data values over a second time period that is shorter than the first time period;
receive an identification of a selection of a first data point in the first graph, wherein the first data point corresponds to a first time range; and
in response to the selection of the first data point:
update, by the user interface module, the user interface data such that the interactive user interface includes a first marker at a location of the first data point; and
update, by the user interface module, the user interface data to include both a second marker at a location of a second data point in the second graph that corresponds to a beginning of the first time range and a third marker at a location of a third data point in the second graph that corresponds to an end of the first time range.

2. The computing system of claim 1, wherein the program instructions are further configured to cause the computing system to:
receive an indication of a change to the first time period in the first graph;
in response to receiving the indication of the change to the first time period, adjust positions of the second and third markers indicating the first time range in the second graph.

3. The computing system of claim 1, wherein the computer readable storage medium further stores program instructions that cause the computing system to update the user interface data to include a list of events that occurred within the first time range.

4. The computing system of claim 3, wherein the first graph, for each event that occurred within the first time range, includes a graphical representation that indicates a data point on the first graph that corresponds with a time that the respective event occurred.

5. The computing system of claim 4, wherein the computer readable storage medium further stores program instructions that cause the computing system to update the user interface data to include a fourth marker at a first location in the first graph corresponding to a first event in the list of events in response to selection of a second location that corresponds to the first event.

6. The computing system of claim 3, wherein the computer readable storage medium further stores program instructions that cause the computing system to:
receive an indication of a selection in the first graph at a fourth data point such that a new event is added at a time that corresponds with the fourth data point; and
update the user interface data to include an identification of the new event.

7. The computing system of claim 6, wherein the computer readable storage medium further stores program instructions that cause the computing system to:
receive an indication that the new event corresponds with the first graph; and
update the user interface data such that a first graphical representation is displayed in the first graph at the time that corresponds with the fourth data point.

8. The computing system of claim 6, wherein the computer readable storage medium further stores program instructions that cause the computing system to:
receive an indication that the new event corresponds with the second graph; and
update the user interface data such that a first graphical representation is displayed in the second graph at the time that corresponds with the fourth data point.

9. The computing system of claim 6, wherein the computer readable storage medium further stores program instructions that cause the computing system to:
receive an indication that the new event corresponds with the first graph and the second graph; and
update the user interface data such that a first graphical representation is displayed in the first graph at the time that corresponds with the fourth data point and a second graphical representation is displayed in the second graph at the time that corresponds with the fourth data point.

10. The computing system of claim 3, wherein the computer readable storage medium further stores program instructions that cause the computing system to:
receive an indication of selection of a first event in the list of events; and
update the user interface data such that the first graph includes a graphical representation at a position of a data point in the first graph that corresponds with the first event.

11. The computing system of claim 1, wherein the computer readable storage medium further stores program instructions that cause the computing system to:
  receive an indication of selection of a first location corresponding to the first time range in the first graph; and
  update the user interface data such that the first graph includes a fourth marker at the first location in the first graph corresponding to the first time range.

12. The computing system of claim 11, wherein the computer readable storage medium further stores program instructions that cause the computing system to update the user interface data such that the second graph includes a fifth marker at a second location in the second graph corresponding to the first time range.

13. The computing system of claim 12, wherein the computer readable storage medium further stores program instructions that cause the computing system to:
  receive an indication of selection of a third location corresponding to a second time in the first graph; and
  update the user interface data such that the first graph includes the fourth marker at the third location in the first graph corresponding to the second time.

14. The computing system of claim 13, wherein the computer readable storage medium further stores program instructions that cause the computing system to update the user interface data such that the second graph includes the fifth marker at a location in the second graph corresponding to the second time.

15. The computing system of claim 1, wherein the first data point comprises a line from a location in the first graph that corresponds with a highest value measured during the first time range to a location in the first graph that corresponds with a lowest value measured during the first time range.

16. The computing system of claim 1, wherein the computer readable storage medium further stores program instructions that cause the computing system to receive an indication that a zoom level of the first graph is adjusted from a first zoom level to a second zoom level.

17. The computing system of claim 16, wherein the computer readable storage medium further stores program instructions that cause the computing system to retrieve, from a cache, for a second time range that corresponds to a first pixel in an x-axis of the first graph, a highest value measured during the second time range and a lowest value measured during the second time range.

18. The computing system of claim 17, wherein the computer readable storage medium further stores program instructions that cause the computing system to update the user interface data such that the first graph includes a line from a location in the first graph that corresponds with the highest value to a location in the first graph that corresponds with the lowest value.

19. A computer-implemented method comprising:
  generating user interface data for rendering an interactive user interface on a computing device, the interactive user interface including a first graph and a second graph, wherein the first graph includes first data values over a first time period and the second graph includes second data values over a second time period that is shorter than the first time period;
  receiving an identification of a selection of a first data point in the first graph, wherein the first data point corresponds to a first time range; and
  in response to the selection of the first data point:
    updating, by a user interface unit of the computing device, the user interface data such that the interactive user interface includes a first marker at a location of the first data point; and
    updating, by the user interface unit, the user interface data to include both a second marker at a location of a second data point in the second graph that corresponds to a beginning of the first time range and a third marker at a location of a third data point in the second graph that corresponds to an end of the first time range.

20. Non-transitory, computer-readable storage media comprising computer-executable instructions for providing data in an interactive user interface, wherein the computer-executable instructions, when executed by a computer system, cause a user interface component of the computer system to:
  generate user interface data for rendering the interactive user interface on a computing device, the interactive user interface including a first graph and a second graph, wherein the first graph includes first data values over a first time period and the second graph includes second data values over a second time period that is shorter than the first time period;
  receive an identification of a selection of a first data point in the first graph, wherein the first data point corresponds to a first time range; and
  in response to the selection of the first data point:
    update, by the user interface component, the user interface data such that the interactive user interface includes a first marker at a location of the first data point; and
    update, by the user interface component, the user interface data to include both a second marker at a location of a second data point in the second graph that corresponds to a beginning of the first time range and a third marker at a location of a third data point in the second graph that corresponds to an end of the first time range.

* * * * *